US012328656B2

(12) United States Patent
Mody et al.

(10) Patent No.: US 12,328,656 B2
(45) Date of Patent: *Jun. 10, 2025

(54) INTELLIGENT NETWORK SLICING AND POLICY-BASED ROUTING ENGINE

(71) Applicant: A10 SYSTEMS INC, Lowell, MA (US)

(72) Inventors: Apurva N. Mody, Chelmsford, MA (US); Bryan Crompton, Lowell, MA (US); Junaid Islam, San Jose, CA (US); David Simpson, Springfield, VA (US); Dap Minh Tran, Lowell, MA (US)

(73) Assignee: A10 SYSTEMS INC, Lowell, MA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/383,680

(22) Filed: Oct. 25, 2023

(65) Prior Publication Data

US 2024/0214904 A1    Jun. 27, 2024

Related U.S. Application Data

(63) Continuation of application No. 18/069,157, filed on Dec. 20, 2022, now Pat. No. 11,812,359.

(60) Provisional application No. 63/291,839, filed on Dec. 20, 2021.

(51) Int. Cl.
*H04W 40/12* (2009.01)
*H04W 16/02* (2009.01)

(52) U.S. Cl.
CPC .......... *H04W 40/12* (2013.01); *H04W 16/02* (2013.01)

(58) Field of Classification Search
None
See application file for complete search history.

(56) References Cited

U.S. PATENT DOCUMENTS

| | | | |
|---|---|---|---|
| 11,812,359 B2* | 11/2023 | Mody | H04W 40/02 |
| 2011/0125905 A1 | 5/2011 | Baucke et al. | |
| 2017/0164349 A1 | 6/2017 | Zhu et al. | |
| 2018/0077023 A1 | 3/2018 | Zhang | |
| 2020/0052991 A1* | 2/2020 | Kodaypak | H04W 24/08 |

(Continued)

*Primary Examiner* — Brian S Roberts
(74) *Attorney, Agent, or Firm* — Polsinelli PC

(57) ABSTRACT

One or more aspects of the present disclosure are directed to network optimization solutions provided as software agents (applications) executed on network nodes in a heterogenous multi-vendor environment to provide cross-layer network optimization and ensure availability of network resources to meet associated Quality of Experience (QoE) and Quality of Service (QoS). In one aspect, a network slicing engine is configured to receive at least one request from at least one network endpoint for access to the heterogeneous multi-vendor network for data transmission; receive information on state of operation of a plurality of communication links between the plurality of nodes; determine a set of data transmission routes for the request; assign a network slice for serving the request; determine, from the set of data transmission routes, an end-to-end route for the network slice; and send network traffic associated with the request using the network slice and over the end-to-end route.

20 Claims, 32 Drawing Sheets
(17 of 32 Drawing Sheet(s) Filed in Color)

(56) References Cited

U.S. PATENT DOCUMENTS

| | | | |
|---|---|---|---|
| 2020/0221346 A1* | 7/2020 | Park | H04L 41/40 |
| 2021/0235367 A1* | 7/2021 | Quinn | H04W 88/06 |
| 2021/0235526 A1* | 7/2021 | Kozlowski | H04W 76/15 |
| 2021/0297933 A1* | 9/2021 | Obaidi | H04W 24/02 |

* cited by examiner

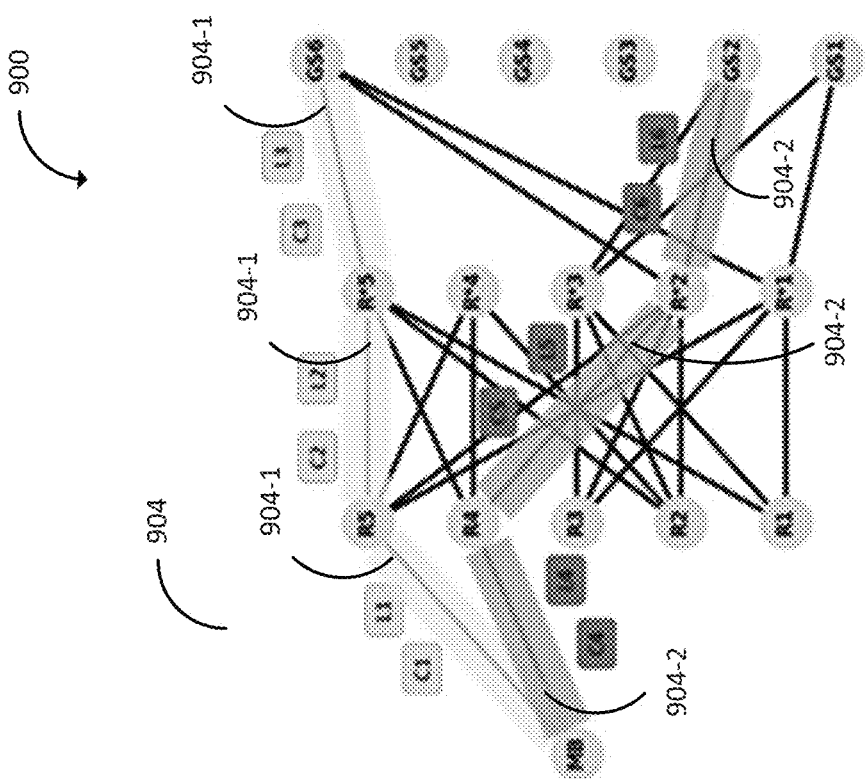
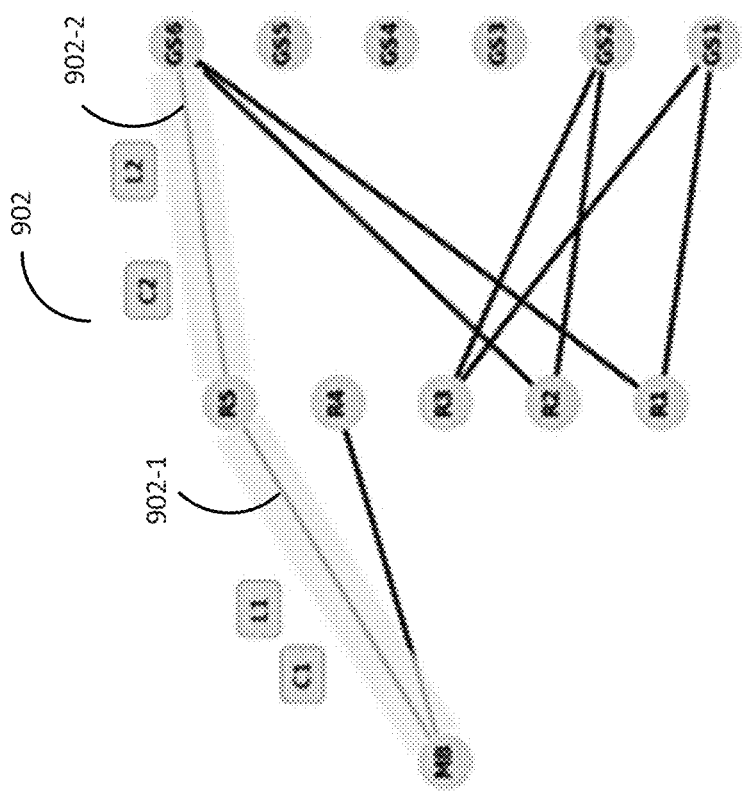
FIG. 9

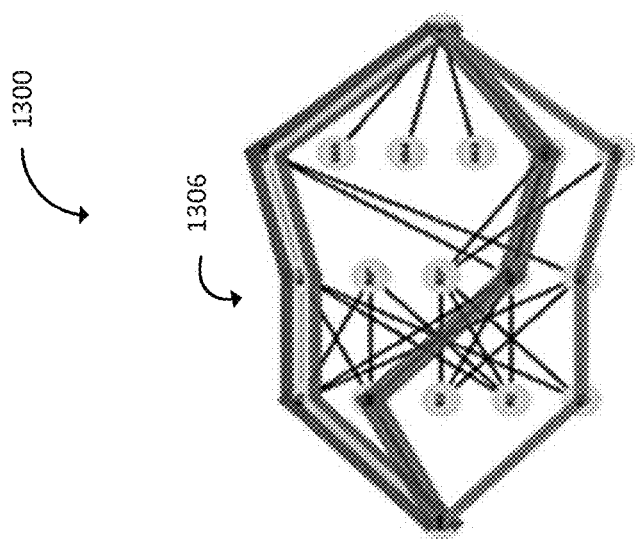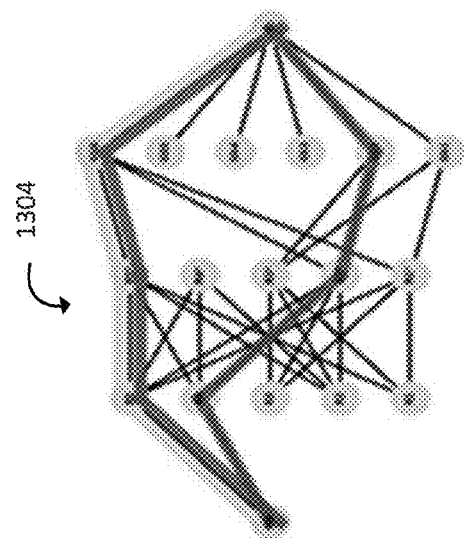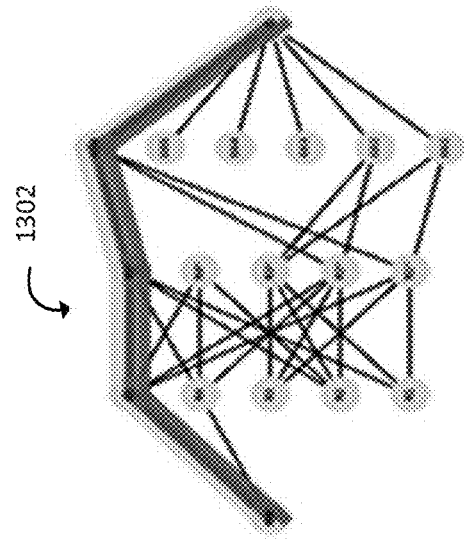
FIG. 13

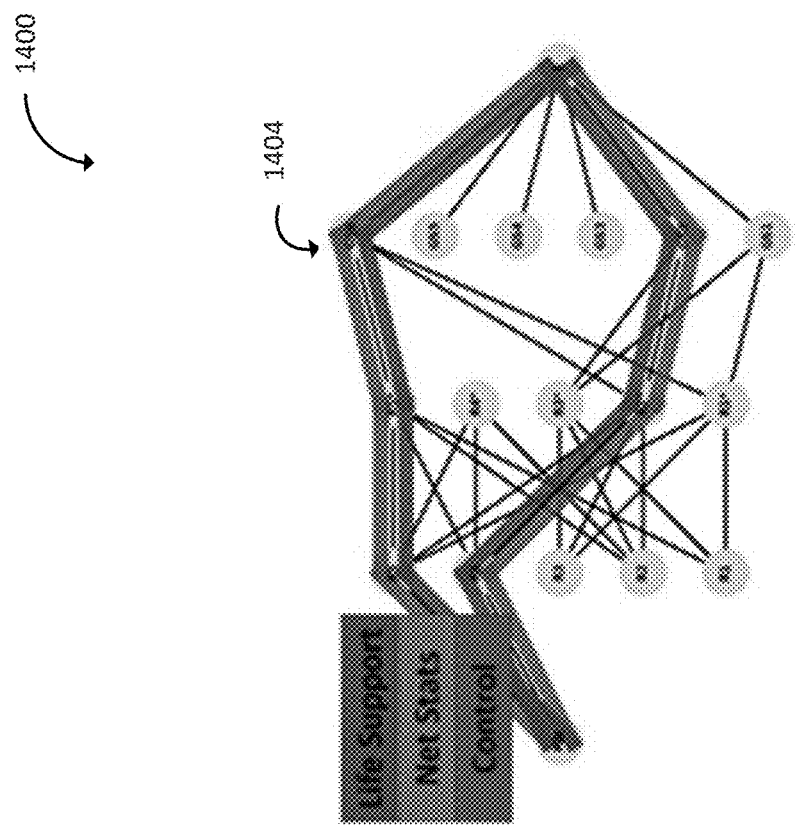
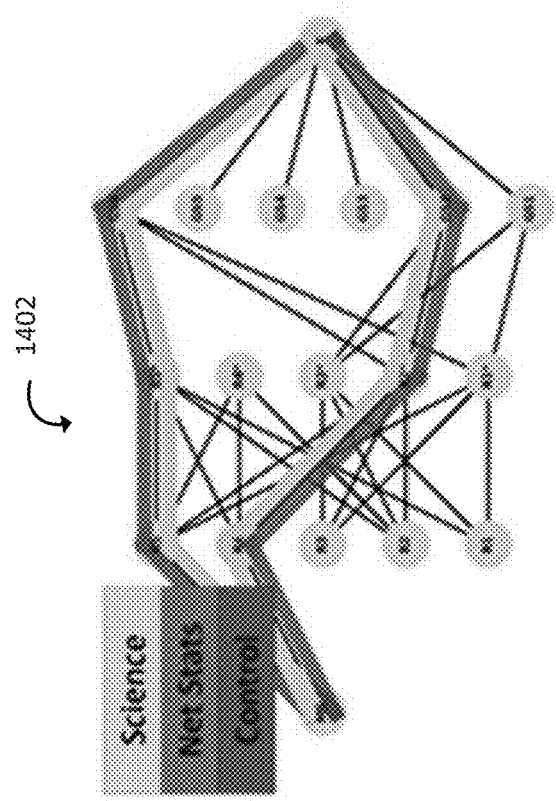
FIG. 14

```
Let S{N} be the set of all slices passing through node N.
Let D be the total amount of data in a dt time interval that the router can transmit
Let q(i) be the buffer size of the ith slice on node N.
Let m(i) be the minimum throughput requirement of the ith slice.
Let delta_q(i) be the determined changes in buffers that the router decides.

# First meet minimum throughput requirements by priorities
For priority class p in {high, medium, low}:
    Calculate the sum, T, of minimum throughput requirements for priority class p of slices S{N}
    If the sum T > D
        Let delta_q += min(q(i), m(i))
        Let D = D – sum(min(q(i), m(i)))
        Repeat loop for the next priority class
    If the sum T < D
        Distribute capacity D equally among all slice S{N}
        D = 0
        Router cannot support lower priority traffic

# Next deal with extra capacity
If D > 0
    Distribute remaining capacity equally among all slices S{N} regardless of priority
If D == 0
    Router either barely meets demands or can only meet demands for high priority traffic
```

INTELLIGENT NETWORK SLICING AND POLICY-BASED ROUTING ENGINE

CROSS REFERENCE TO RELATED APPLICATIONS

This application is a continuation of and claims the benefit of U.S. application Ser. No. 18/069,157, filed on Dec. 20, 2022, and entitled "INTELLIGENT NETWORK SLICING AND POLICY-BASED ROUTING ENGINE"; which claims the benefit of priority to U.S. provisional application No. 63/291,839, filed Dec. 20, 2021, and entitled "INTELLIGENT NETWORK SLICING AND POLICY-BASED ROUTING ENGINE," the disclosure of which is hereby incorporated by reference herein in its entirety for all purposes.

STATEMENT REGARDING FEDERALLY SPONSORED RESEARCH OR DEVELOPMENT

This application was made with government support under Contracts No. 80NSSC21C0205 and 80NSSC22CA141 awarded by the National Aeronautics and Space Administration (NASA) under the Small Business Innovation Research Program. The U.S. Government has certain rights in this invention.

TECHNICAL FIELD

The subject matter of this disclosure generally relates to the field of wireless network operations and, more particularly, to optimization of network operations in heterogeneous multi-vendor network architectures.

BACKGROUND

Wireless broadband represents a critical component of economic growth, job creation, and global competitiveness because consumers are increasingly using wireless broadband services to assist them in their everyday lives. Demand for wireless broadband services and the network capacity associated with those services is surging, resulting in the development of a variety of systems and architectures that can meet this demand including, but not limited to, mixed topologies of heterogeneous multi-vendor networks.

Managing network traffic in any heterogeneous multi-vendor network is an extremely complex process due to the existence of different environments in which data is communicated and/or different systems (e.g., WiFi, 4G, 5G, radar, etc.).

SUMMARY

One or more aspects of the present disclosure are directed to one or more network optimization solutions provided as software agents (applications) executed on various network nodes in a heterogenous multi-vendor environment to provide cross-layer network optimization and ensure availability of network resources for any user thereof to meet associated Quality of Experience (QoE) and Quality of Service (QoS).

In one aspect, a heterogeneous multi-vendor network includes a plurality of nodes configured to enable wireless communication between at least two network endpoints, each of the plurality of nodes being configured to operate according to one of a plurality of wireless communication schemes; and a network slicing engine executed on at least one of the plurality of nodes. The network slicing engine being configured to receive at least one request from at least one network endpoint for access to the heterogeneous multi-vendor network for data transmission; receive information on state of operation of a plurality of communication links between the plurality of nodes; determine a set of data transmission routes for the request; assign a network slice for serving the request; determine, from the set of data transmission routes, an end-to-end route for the network slice; and send network traffic associated with the request using the network slice and over the end-to-end route.

In another aspect, network slicing engine is configured to receive the information on the state of operation of the plurality of links from a software application executed one each of the plurality of nodes, the software application is configured to perform cross-layer optimization of a corresponding one of the plurality of communication links.

In another aspect, the plurality of wireless communication schemes include at least two or more of 4G, 5G, 6G, WiFi, and radar communication schemes.

In another aspect, each of the plurality of nodes is configured to execute the network slicing thereon.

In another aspect, the at least one request includes a description of the request, an acceptable latency associated with the request, an acceptable throughput associated with the request, and a corresponding Quality of Experience associated with the request.

In another aspect, the end-to-end route is data path through at least two of the plurality of wireless communication schemes.

In another aspect, the network slicing engine is configured to select the network slice from among a plurality of network slices available in a network slice inventory.

In another aspect, the network slicing engine is configured to receive the plurality of network slices from the network slice inventory.

In another aspect, the network slicing engine is configured to select the network slice based on one or more parameters associated with the request.

In another aspect, the network slicing engine is configured to determine the end-to-end route across heterogeneous multi-vendor network by determining a solution to an optimization problem.

In another aspect, the optimization problem is based on the set of data transmission routes and associated characteristics of each transmission route in the set, one or more performance parameters associated with the request, and available network slices.

In one aspect, one or more non-transitory computer-readable media include computer-readable instructions, which when executed by one or more controllers in a heterogeneous multi-vendor network having a plurality of nodes configured to enable wireless communication between at least two network endpoints, with each of the plurality of nodes being configured to operate according to one of a plurality of wireless communication schemes, cause the controller to receive at least one request from at least one network endpoint for access to the heterogeneous multi-vendor network for data transmission; receive information on state of operation of a plurality of communication links between the plurality of nodes; determine a set of data transmission routes for the request; assign a network slice for serving the request; determine, from the set of data transmission routes, an end-to-end route for the network slice; and send network traffic associated with the request using the network slice and over the end-to-end route.

In one aspect, a method may be implemented in a heterogeneous multi-vendor network that includes a plurality of nodes configured to enable wireless, terrestrial or space communication between at least two network endpoints, each of the plurality of nodes being configured to operate according to one of a plurality of wireless communication schemes; and a network slicing engine executed on at least one of the plurality of nodes. The method, by the network slicing engine, includes receiving at least one request from at least one network endpoint for access to the heterogeneous multi-vendor network for data transmission; receiving information on state of operation of a plurality of communication links between the plurality of nodes; determining a set of data transmission routes for the request; assign a network slice for serving the request; determining, from the set of data transmission routes, an end-to-end route for the network slice; and sending network traffic associated with the request using the network slice and over the end-to-end route.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Figure 2:
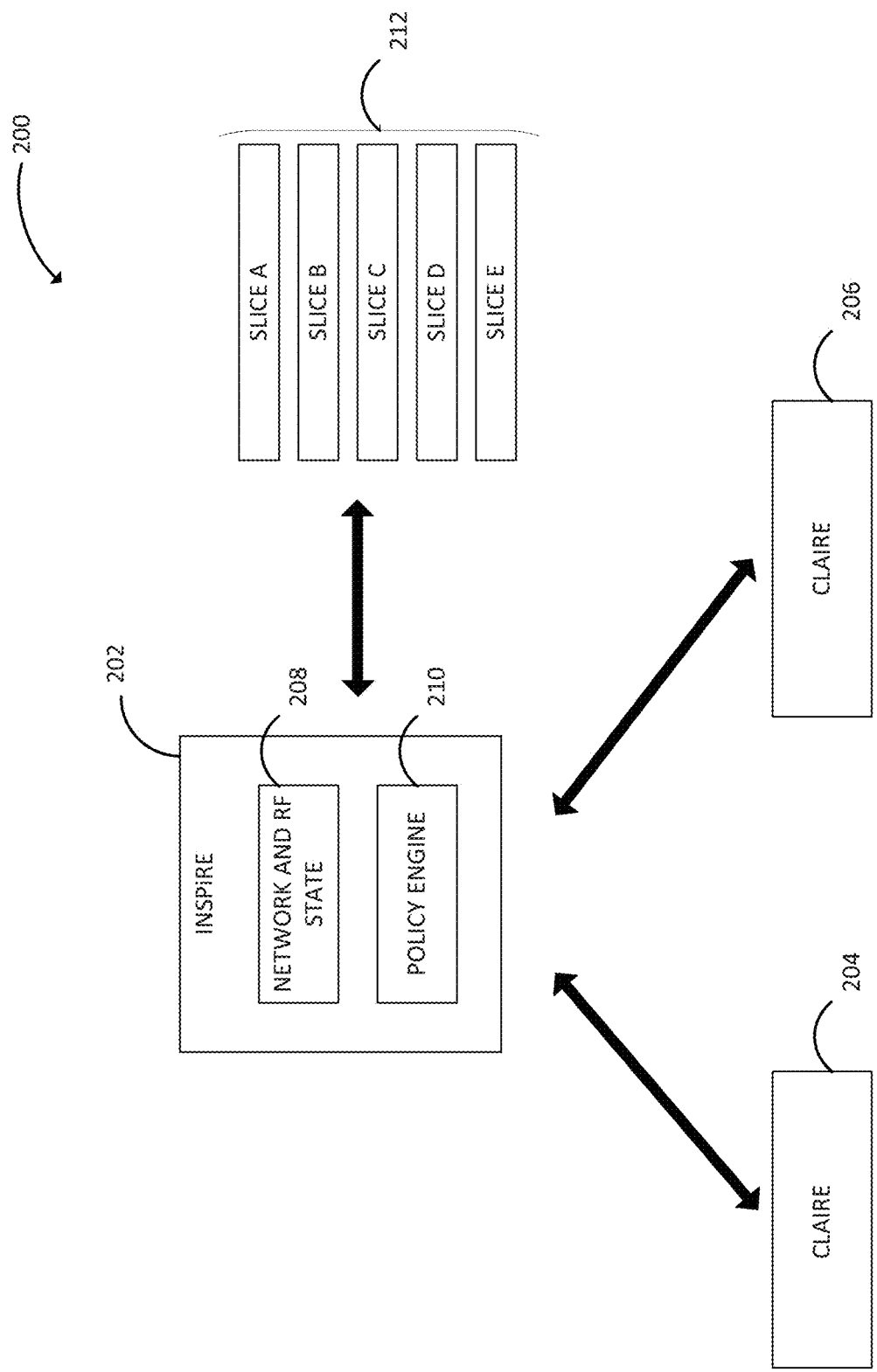
Figure 3:
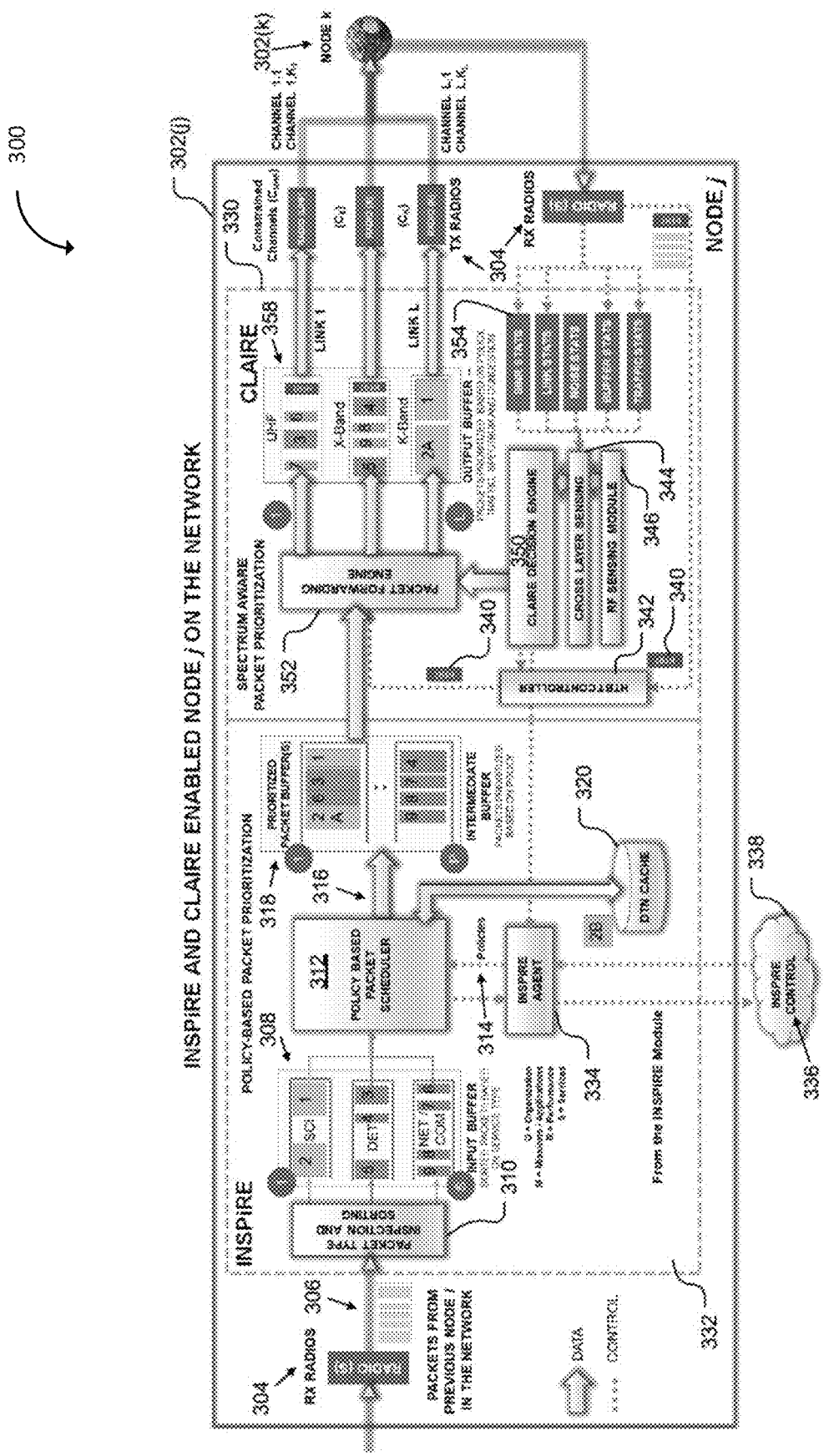
Figure 4:
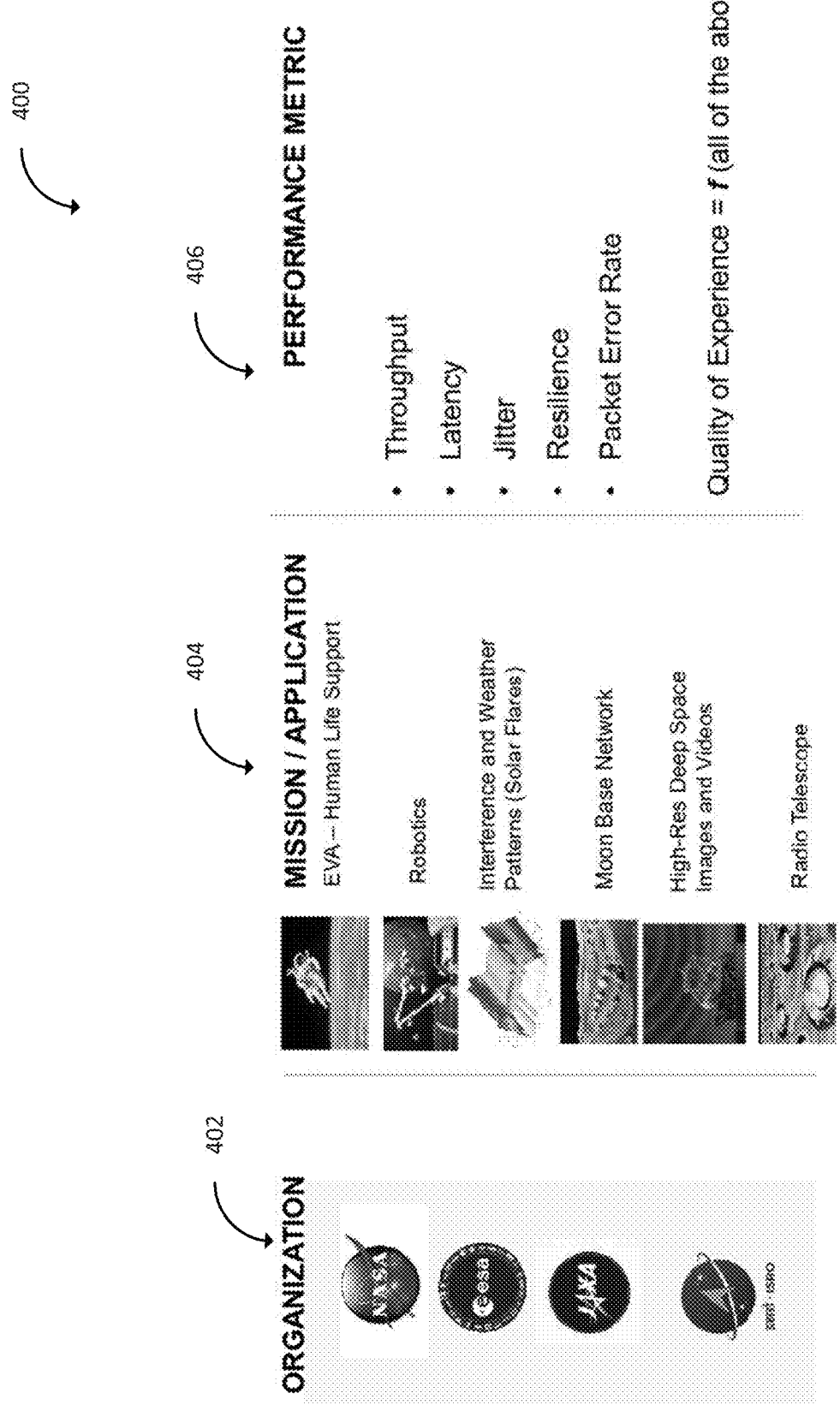
Figure 5:
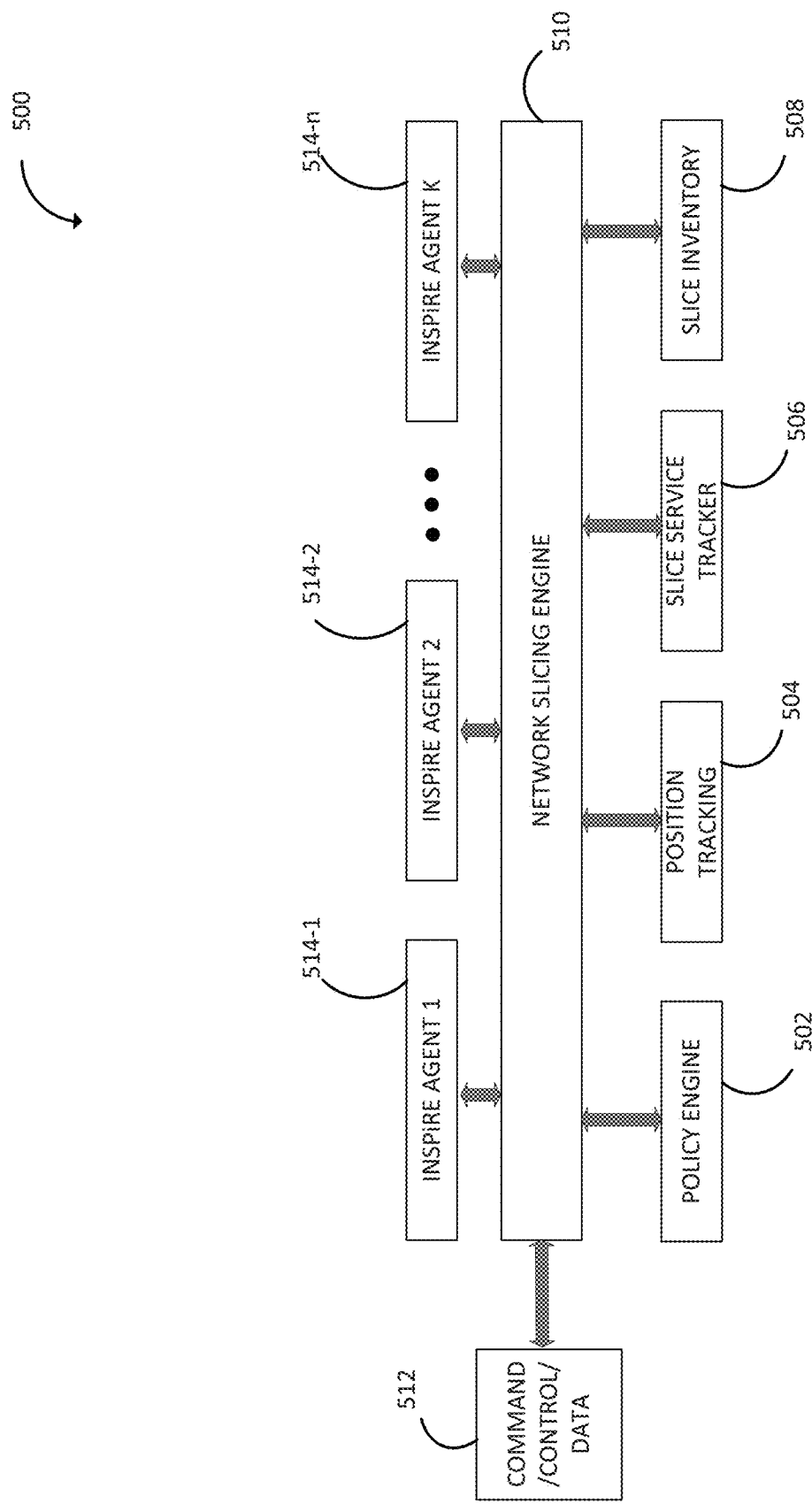
Figure 6:
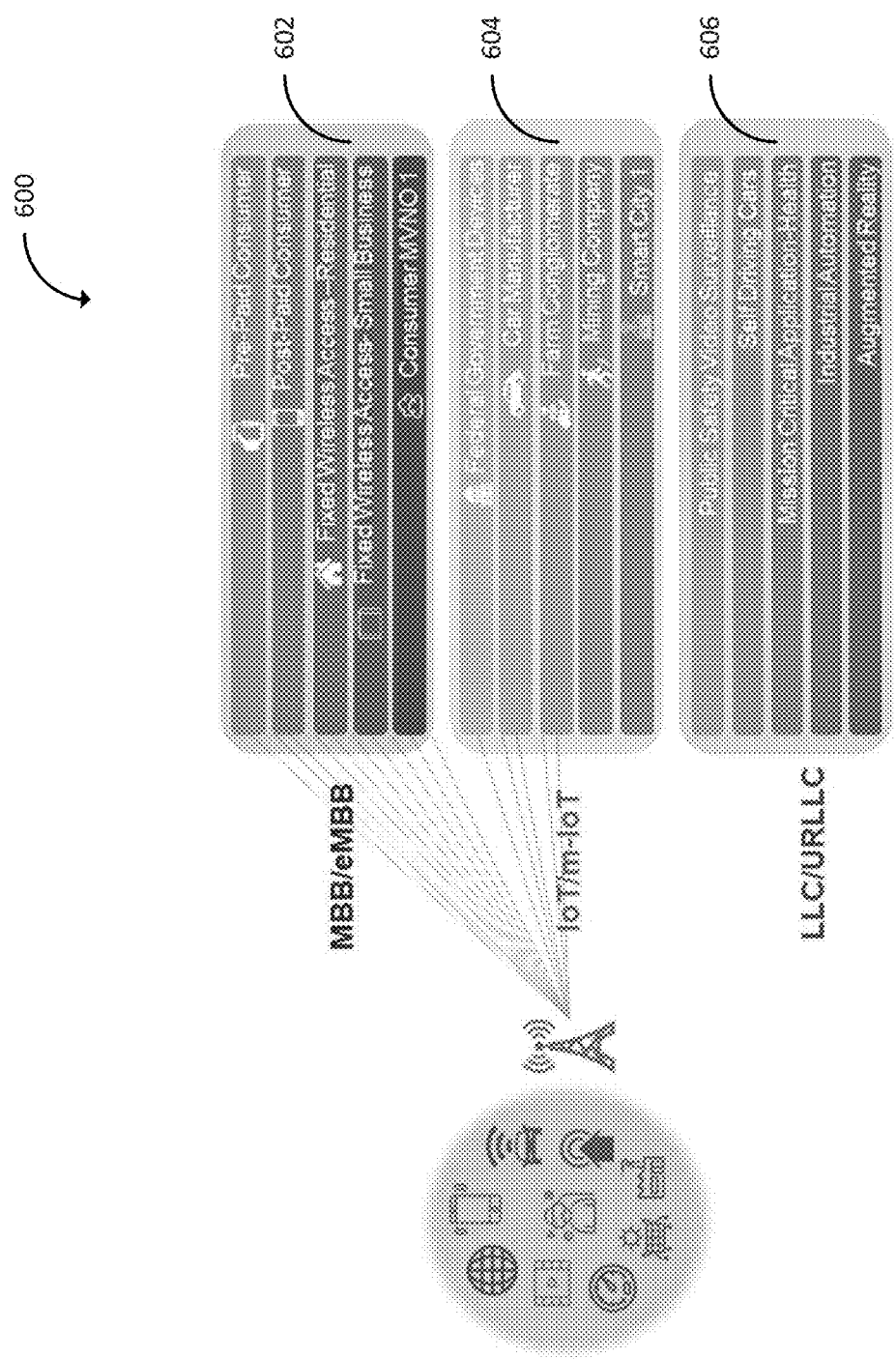
Figure 7:
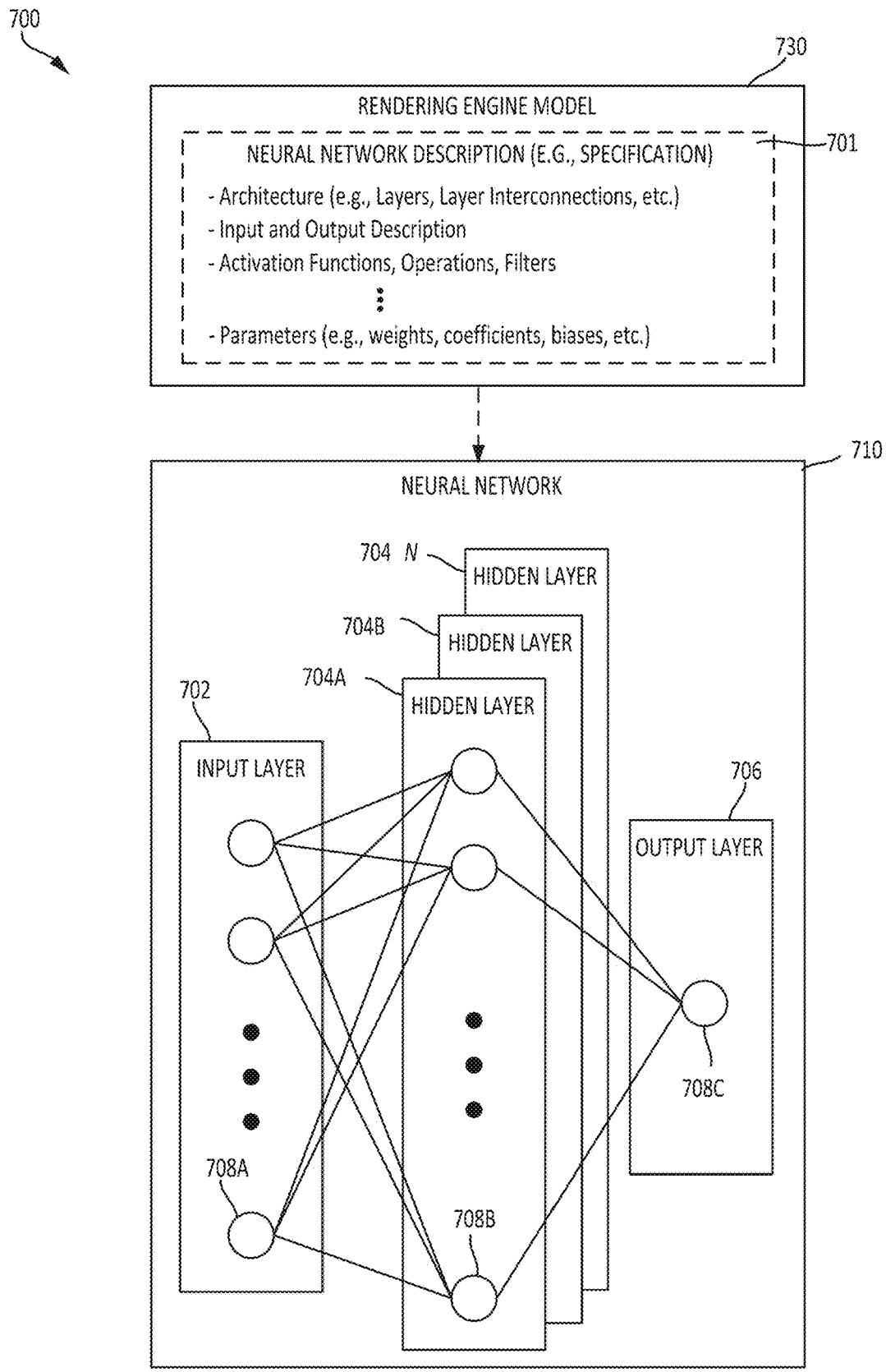
Figure 8:
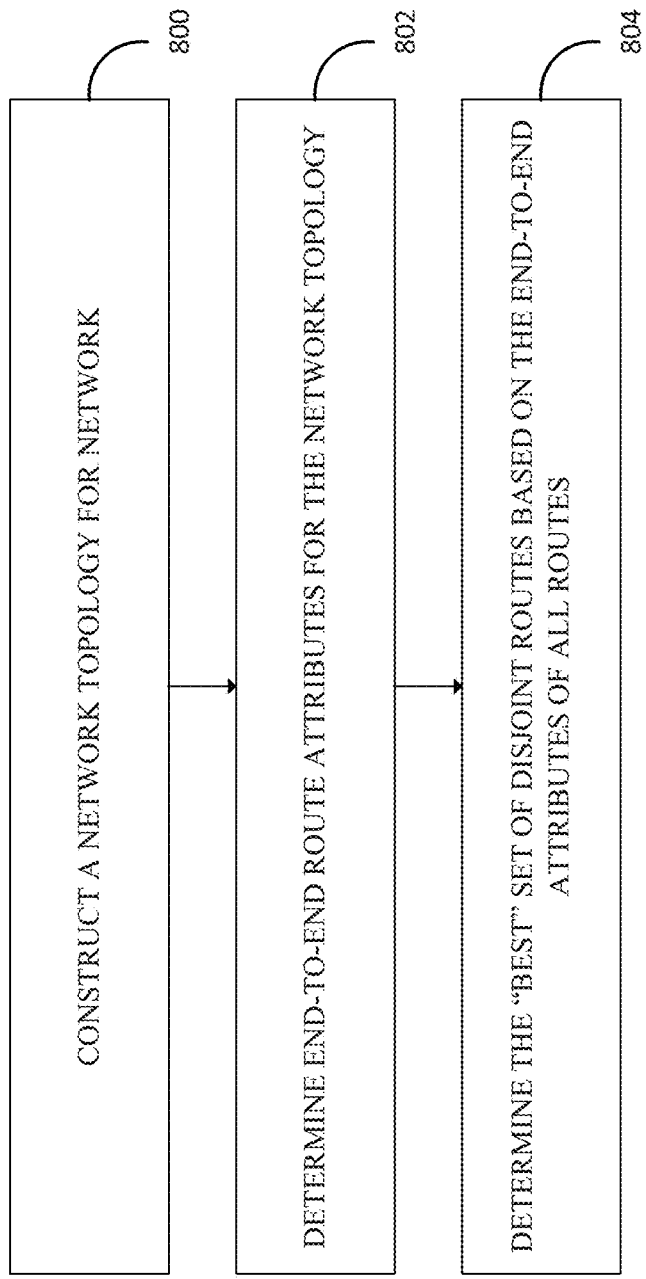
Figure 10:
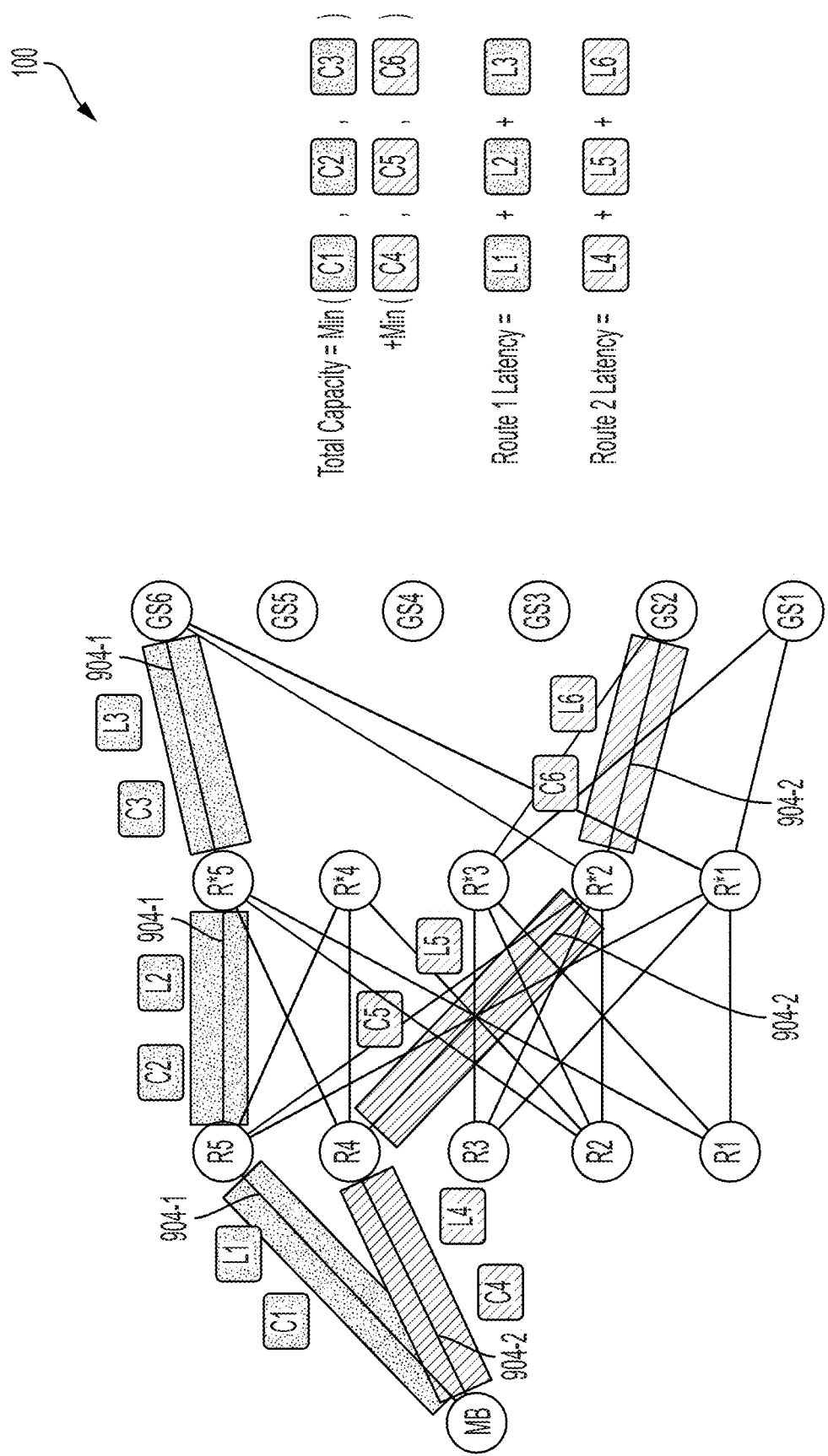
Figure 11:
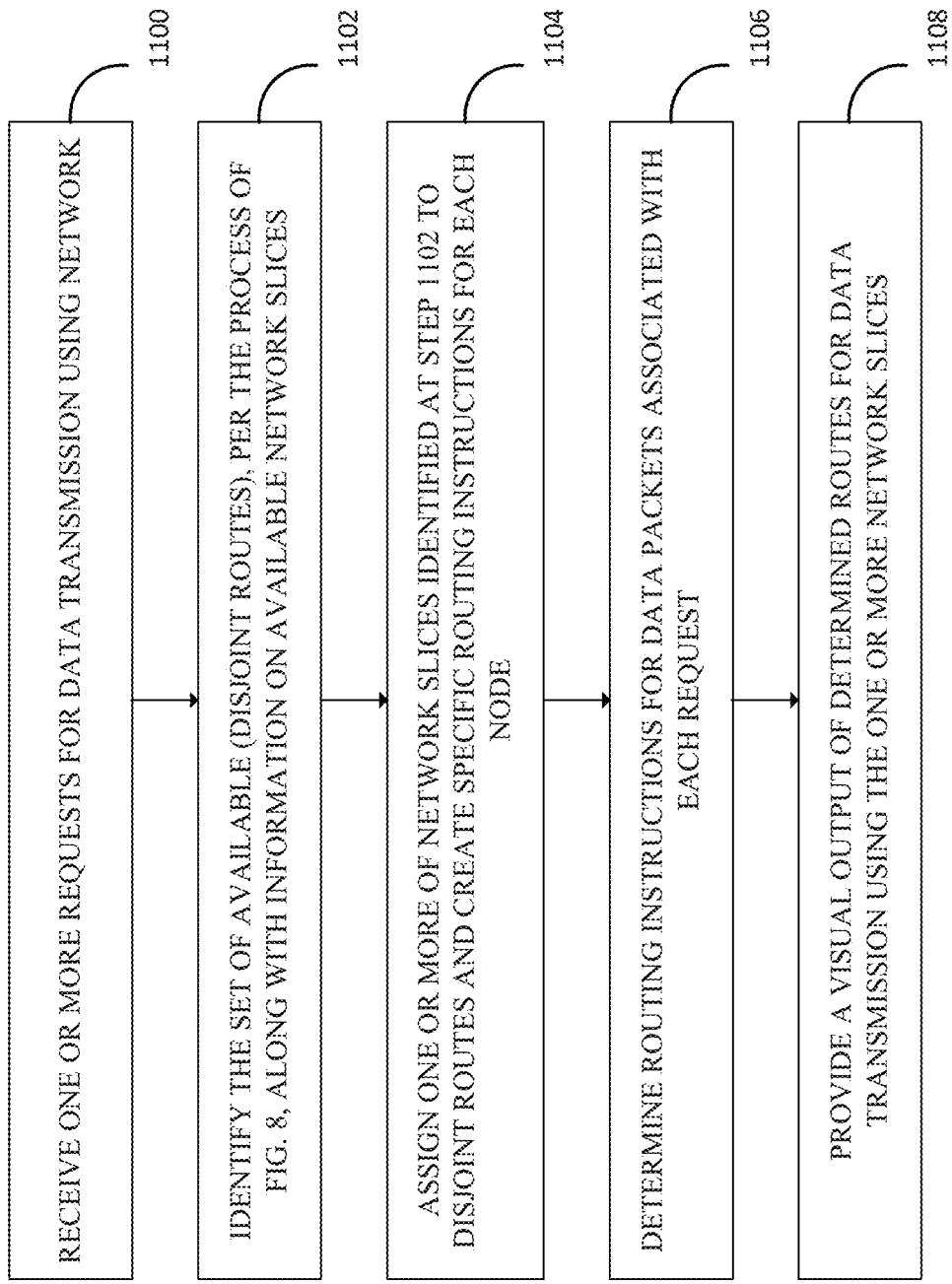
Figure 12:
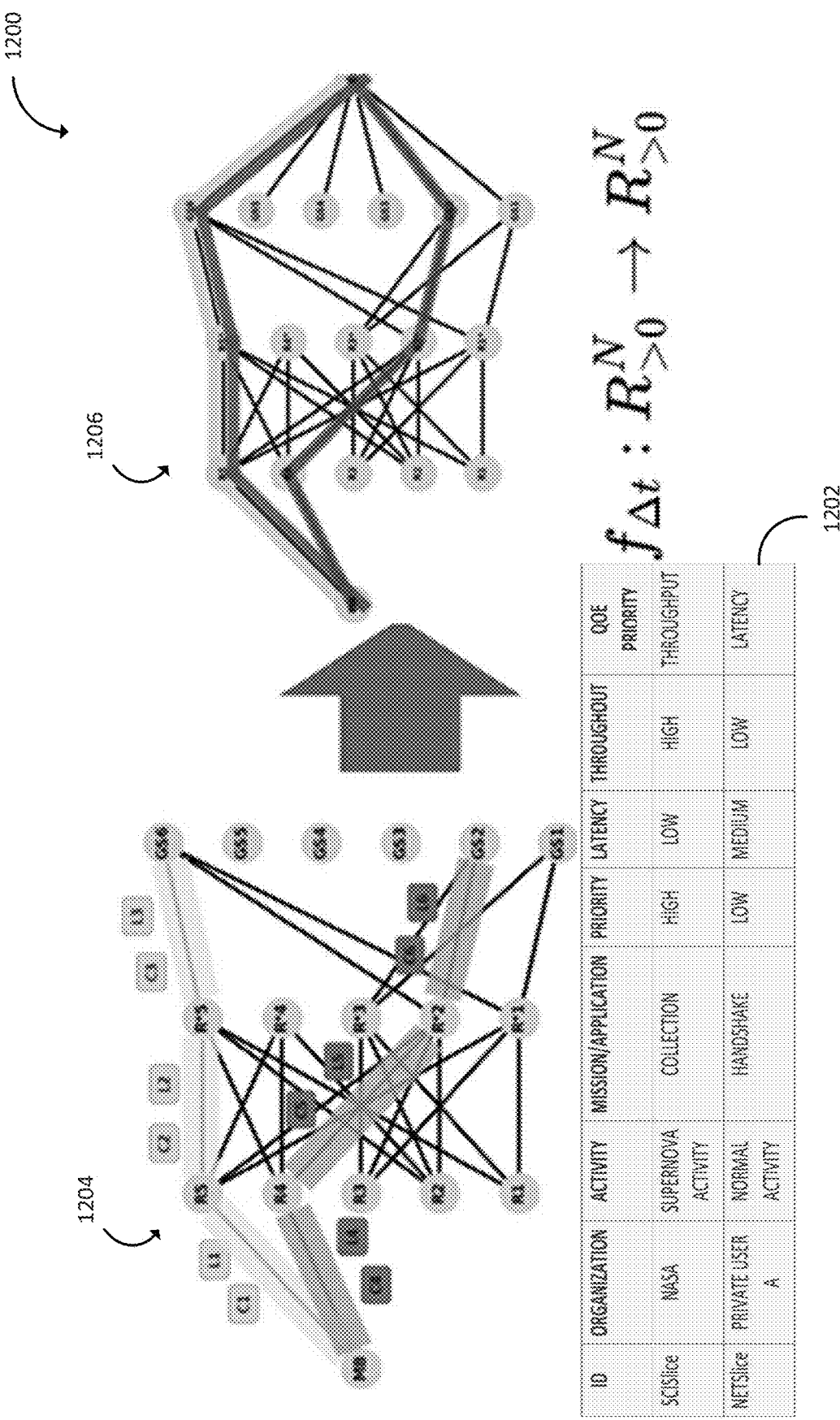
Figure 16:
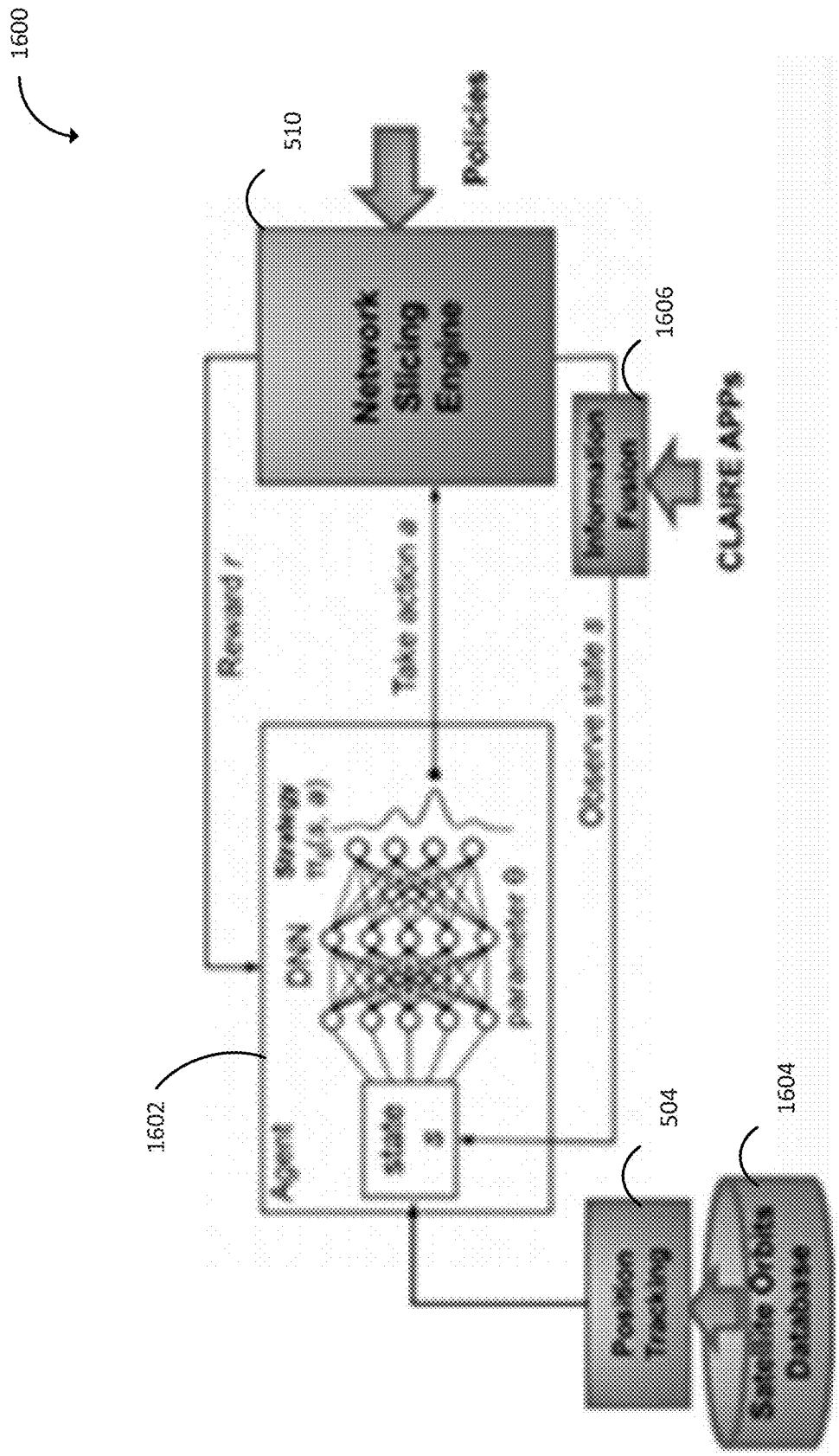
Figure 17:
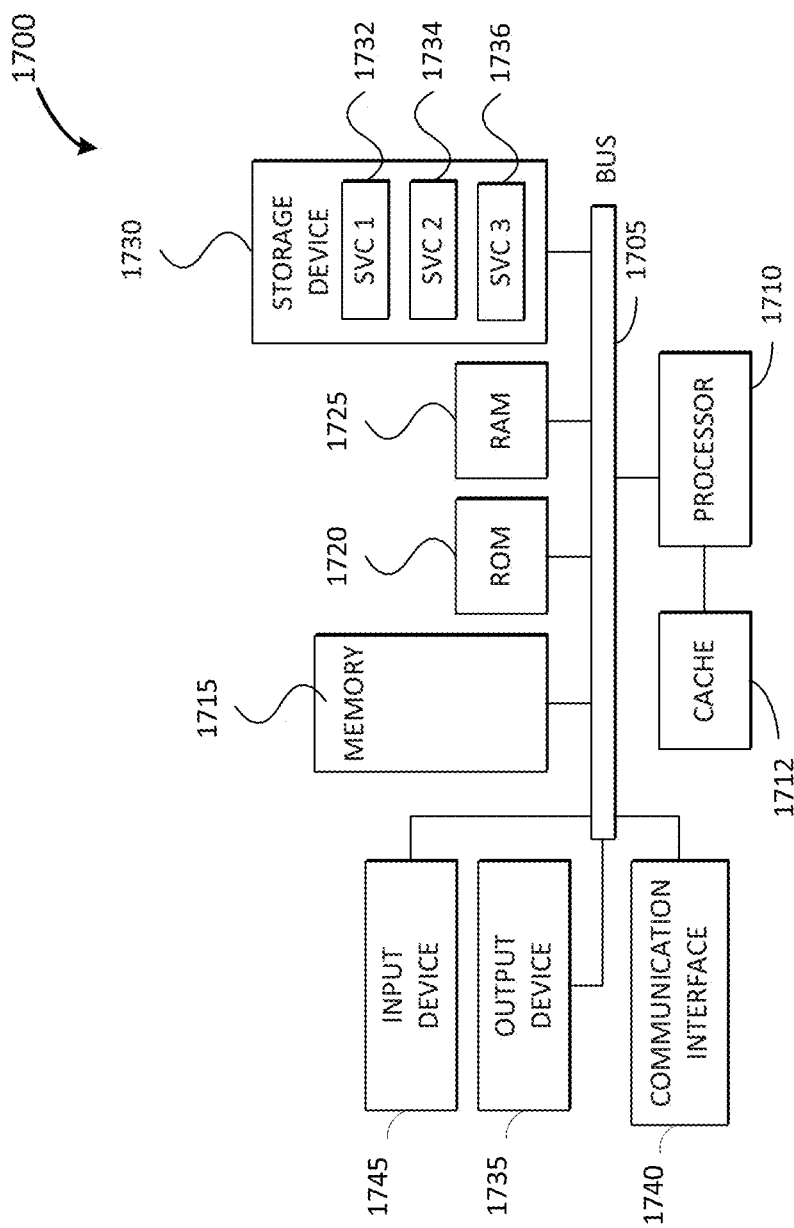
Figure 18:
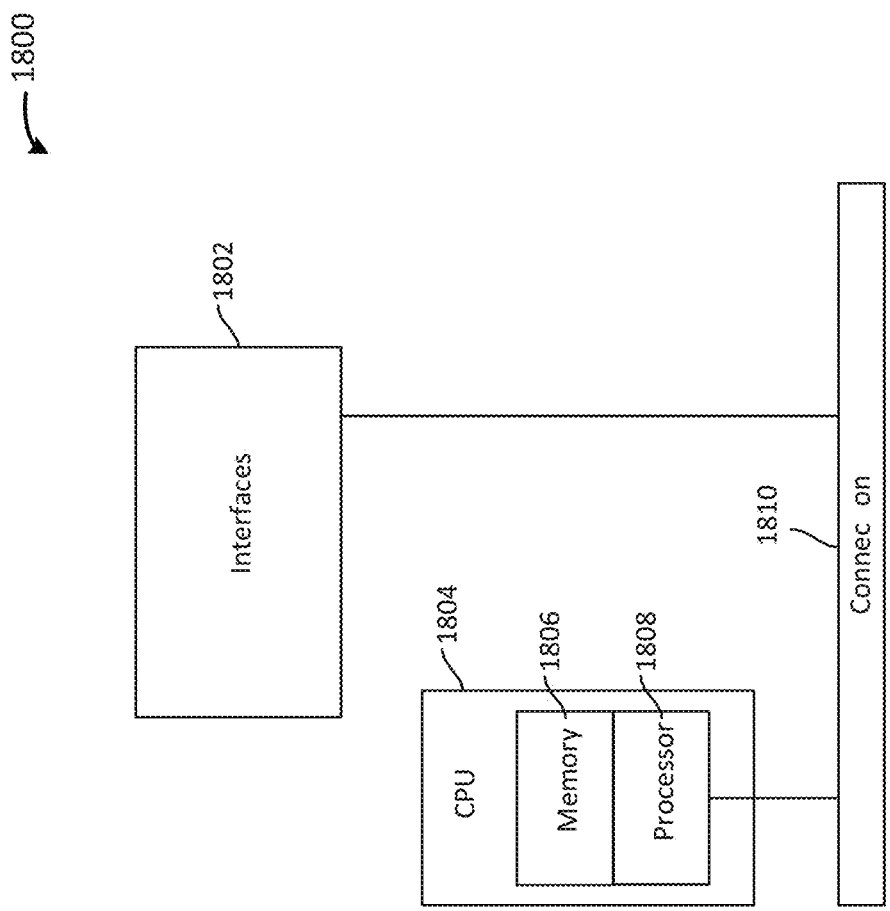
Figure 25:
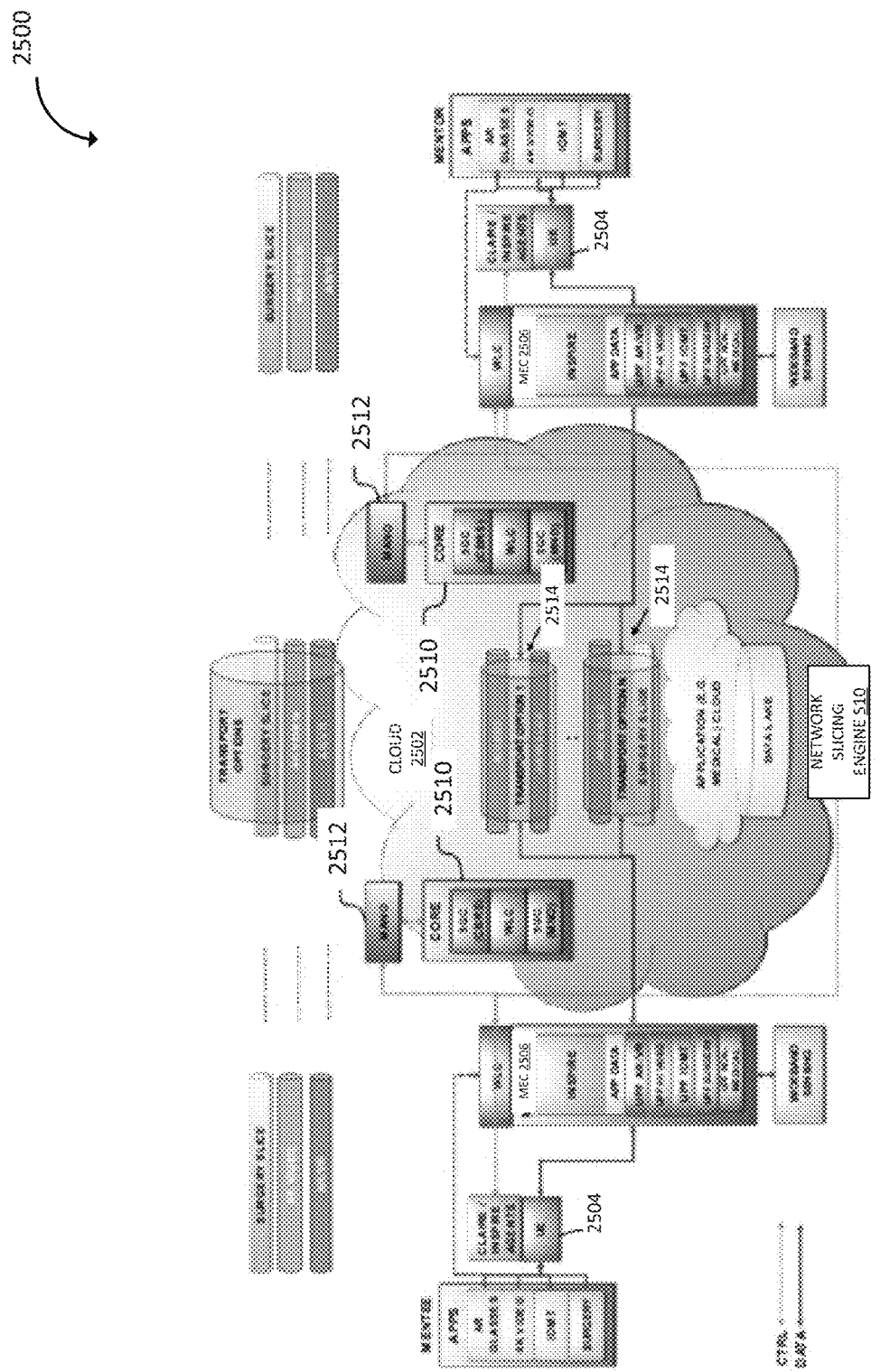
Figure 26:
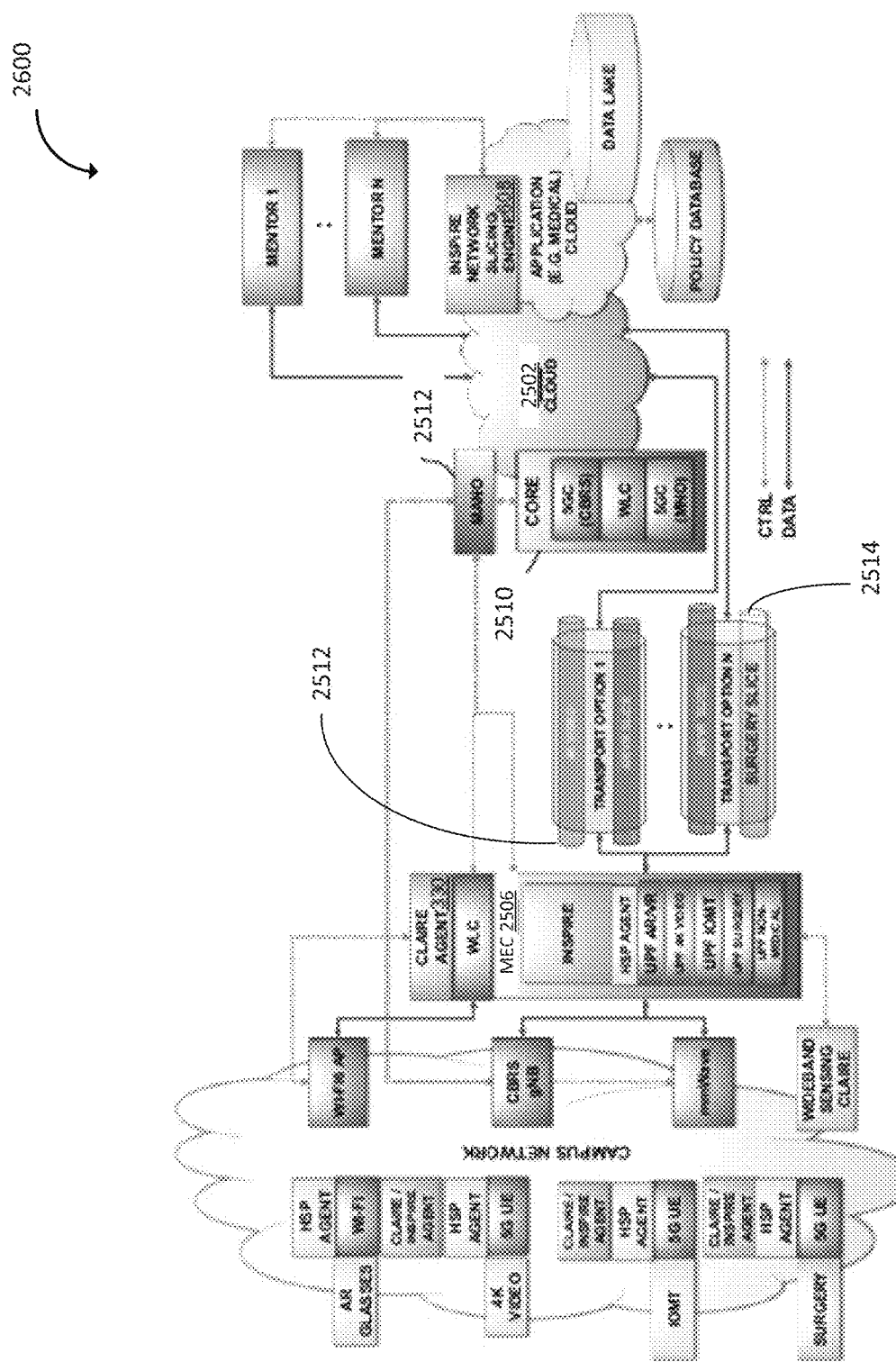
Figure 27:
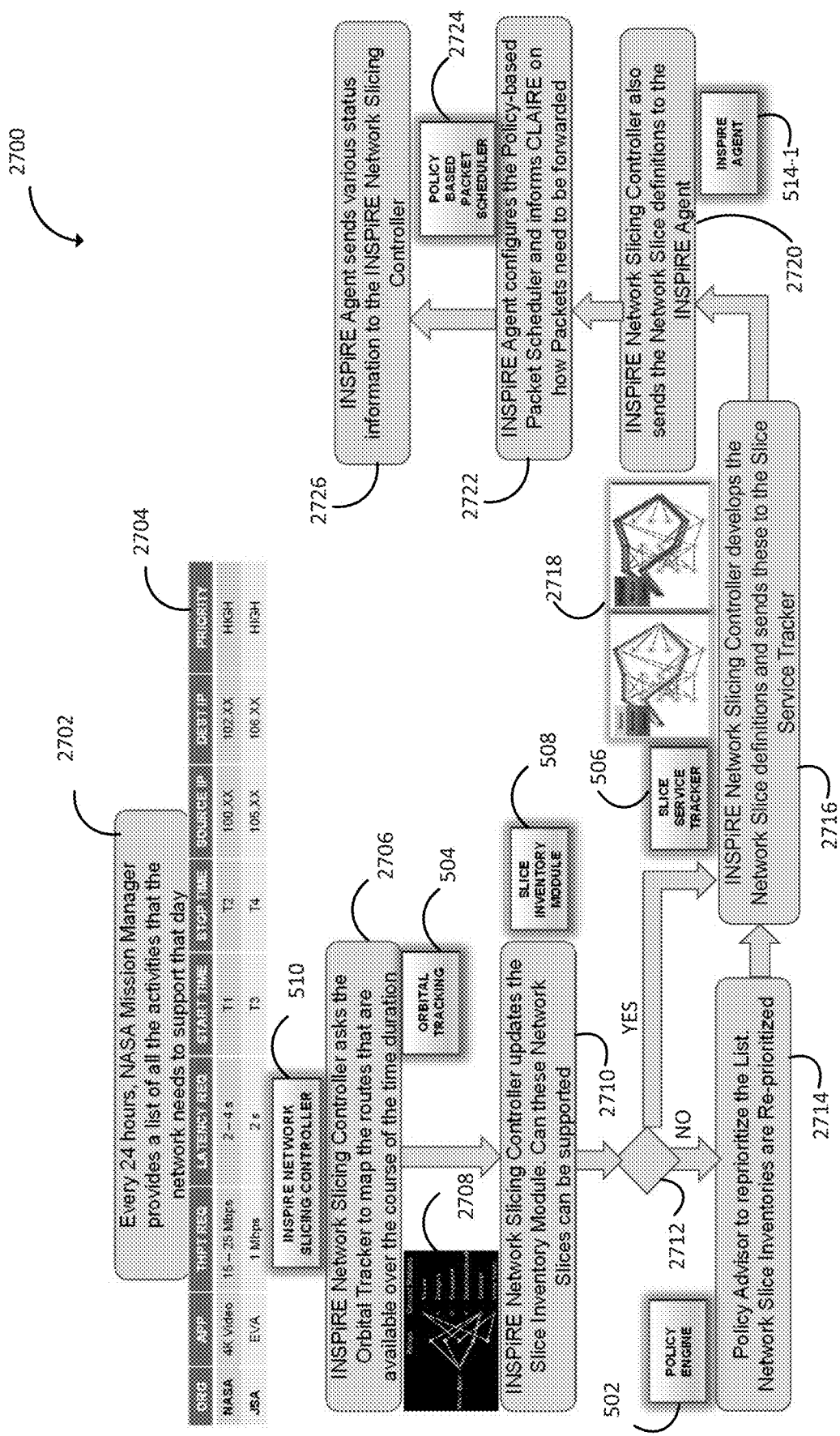
Figure 28:
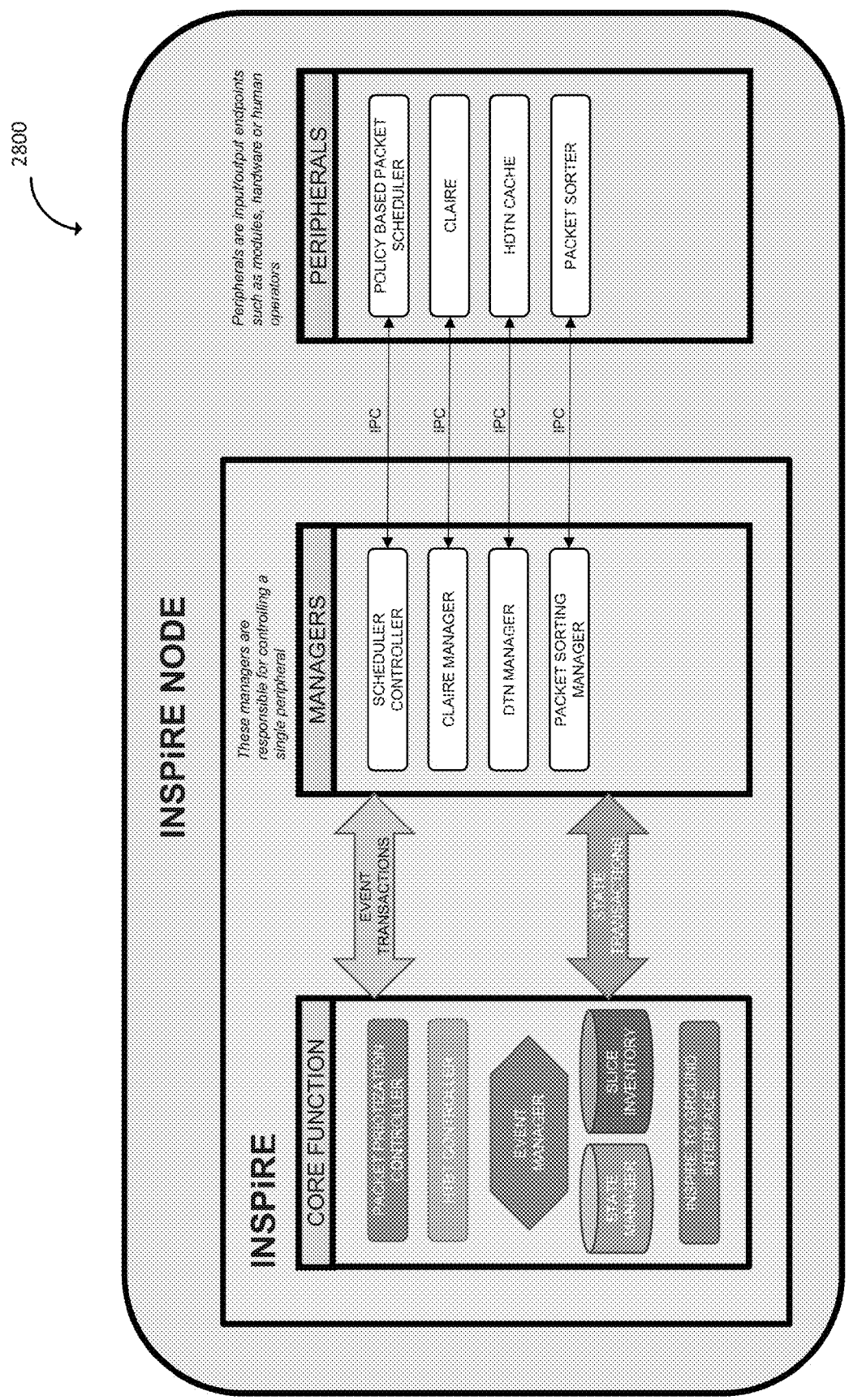
Figure 29:
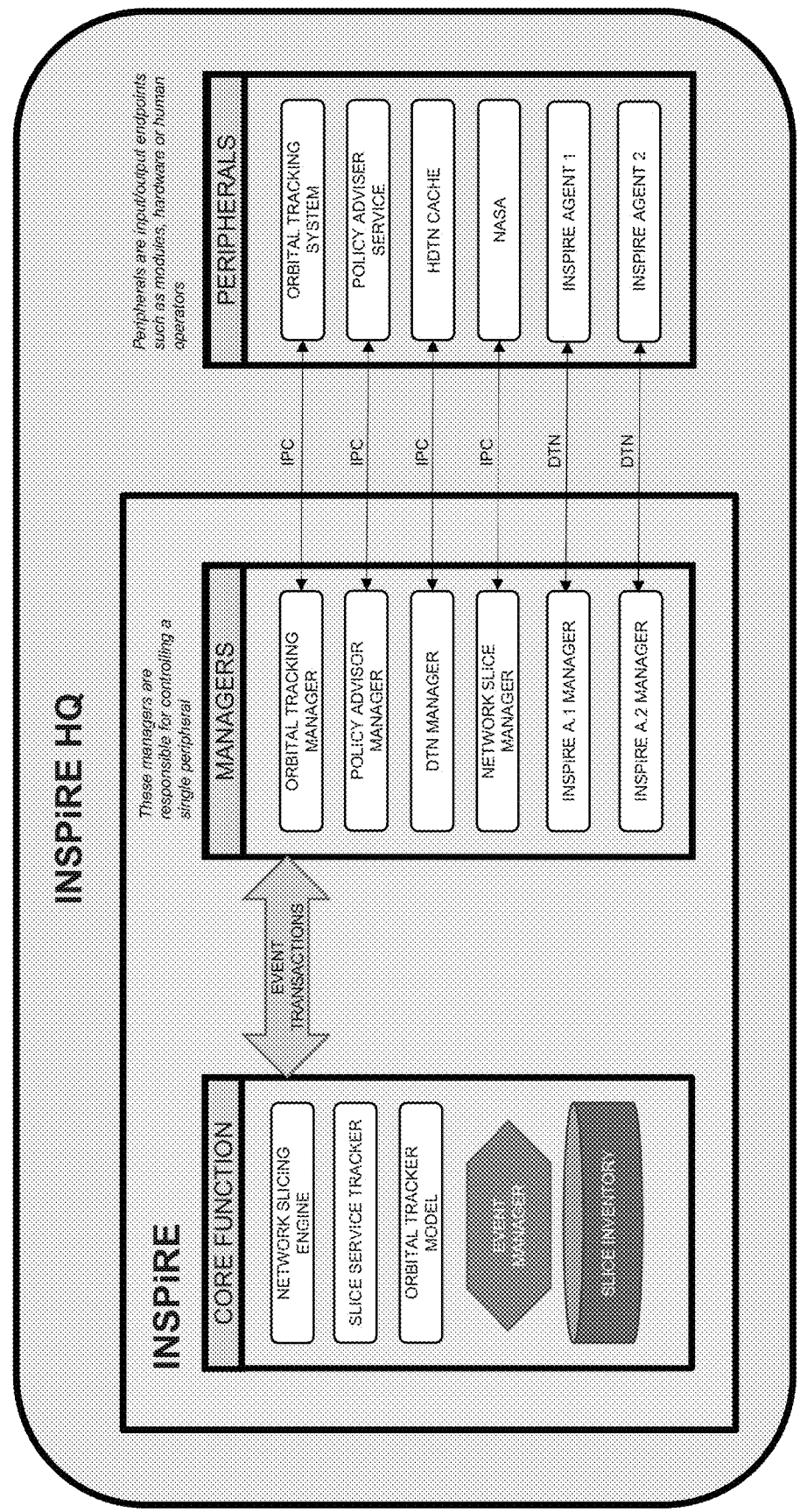

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1A-D illustrate various aspects a non-limiting example of a heterogenous multi-vendor architecture deployed for enabling space communication according to some aspects of the present disclosure;

FIG. 2 illustrates an abstraction of inner-workings of a CLAIRE application and INSPiRE module, according to some aspects of the present disclosure;

FIG. 3 illustrates an example architecture of CLAIRE and INSPiRE Modules on a network node, according to some aspects of the present disclosure;

FIG. 4 illustrates a non-limiting example of policies based on organization, mission/application, and performance metrics according to some aspects of the present disclosure;

FIG. 5 illustrates components of an example INSPiRE module according to some aspects of the present disclosure;

FIG. 6 illustrates a non-limiting example of resource allocation at the physical layer for different network slices determined by INSPiRE module of FIG. 5 according to some aspects of the present disclosure;

FIG. 7 illustrates an example neural network that can be utilized by INSPiRE modules to perform network slicing and policy-base routing of network traffic in a heterogeneous multi-vendor communication network according to some aspects of the present disclosure;

FIG. 8 illustrates an example process for network slice selection and policy-based routing according to some aspects of the present disclosure;

FIG. 9 illustrates an example of a network topology construct according to some aspects of the present disclosure;

FIG. 10 illustrates an example of disjoint paths along with associated link capacities and latencies according to an aspect of the present disclosure;

FIG. 11 illustrates an example process of determining network slices and providing routing instructions according to some aspects of the present disclosure;

FIG. 12 illustrates an example schematic of how slices are assigned to different requests along with corresponding routing instructions according to some aspects of the present disclosure;

FIG. 13 illustrates three non-limiting examples of assigning slices to different requests according to some aspects of the present disclosure;

FIG. 14 illustrates two non-limiting examples of advanced slice assignments with different Quality of Experience goals according to some aspects of the present disclosure;

FIG. 15 provides an example table of routing instructions according to some aspects of the present disclosure;

FIG. 16 illustrates an example architecture of an INSPiRE module with an embedded trained neural network component according to aspects of the present disclosure;

FIG. 17 illustrates an example network device according to some aspects of the present disclosure;

FIG. 18 illustrates an example network device suitable for performing switching, routing, load balancing, and other networking operations according to some aspects of the present disclosure;

Figure 19:
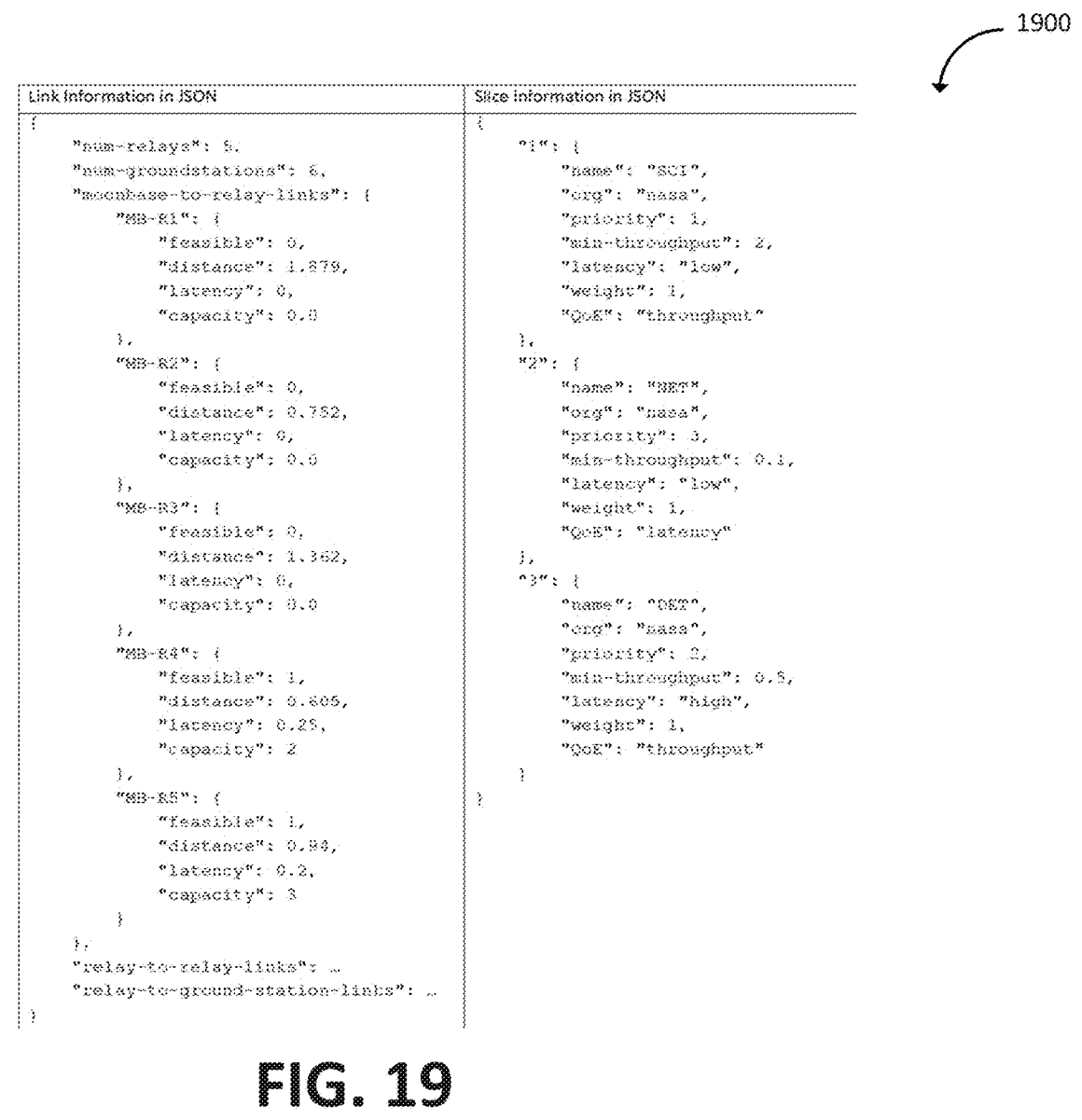

FIG. 19 illustrates an example table of JSON files according to some aspects of the present disclosure;

FIGS. 20-24 illustrate example outputs of slice selection and traffic routing according to some aspects of the present disclosure;

FIGS. 25 and 26 illustrate example applications of use of INSPiRE and CLAIRE according to some aspects of the present disclosure;

FIG. 27 illustrates an example application of a network slice selection and policy-based routing according to some aspects of the present disclosure;

FIG. 28 shows an example software architecture of an INSPiRE module of FIG. 5, according to some aspects of the present disclosure; and FIG. 29 shows the INSPiRE software architecture at the Mission Control (HQ) according to some aspects of the present disclosure.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following is a table of acronyms that may be used/references throughout the present disclosure.

| Acronyms | |
|---|---|
| AGI | Analytical Graphics, Inc |
| API | Application Programming Interface |
| APP | Application or Application Layer |
| CCC | Common Control Channel |
| CCSDS | Consultative Committee for Space Data Systems |
| CDE | CLAIRE Decision Engine |
| CLAIRE | Cross Layer Spectrum Aware Cognitive Control Plane and Intelligent Routing Engine |
| CLS | Cross Layer Sensing |
| Comms | Communications |
| DARPA | Defense Advanced Research Projects Agency |
| DBB | Differential Buffer Backlog |
| DCNN | Deep Convolutional Neural Network |

| Acronyms -continued | |
|---|---|
| DDTRX | Direct Digital Transceiver |
| DSA | Dynamic Spectrum Access |
| EVA | Extravehicular Activity |
| FIFO | First in, First Out |
| GUI | Graphical User Interface |
| HDTN | High Speed Delay Tolerant Network |
| HTTP | Hypertext Transfer Protocol |
| ICD | Interface Control Document |
| INSPiRE | Intelligent Network Slicing & Policy-based Routing Engine |
| JSON | JavaScript Object Notification |
| JSON-RPC | JSON Remote Procedure Call |
| MAC | Medium Access Control Layer |
| MB | Moon Base |
| MIMO | Multiple-Input Multiple-Output |
| NESS | Network Slicing Engine System |
| NET | Network Layer |
| NFV | Network Function Virtualization |
| OFDM | Orthogonal Frequency-Division Multiplexing |
| OODA | Observe Orient Decide and Act |
| OS | Operating System |
| OWL | Web Ontology Language |
| PE | Policy Engine |
| PF | Packet Forwarding |
| PHY | Physical Layer |
| PNT | Positioning, Navigation, and Timing |
| QoE | Quality of Experience |
| RAN | Radio Area Network |
| RDF | Resource Description Framework |
| RF | Radio Frequency |
| SADR | Spectrum and Delay Aware Routing |
| SCaN | Space Communications and Navigation |
| SISO | Single-Input Single-Output |
| SOA | Service Oriented Architecture |
| SON | Self-Organizing Network |
| SPARQL | SPARQL Protocol and RDF Query Language |
| STK | Systems Tool Kit |
| TCP | Transmission Control Protocol |
| UHF | Ultra-High Frequency |
| W3C | World Wide Web Consortium |
| XML | Extensible Markup Language |

As noted above, managing network traffic in heterogenous multi-vendor environments where different types of wireless service providers (e.g., WiFi, 4G, 5G, radar, etc.) are interconnected in different environments to provide connectivity to various connected endpoints, is a very complex problem. The overall end to end connectivity may span various transport mechanisms which may include wireless, cables and optical fibers Modern communications systems commonly suffer from interference and network congestion. These impairments affect the Quality of Service (QoS) for information delivery and Quality of Experience (QoE) for the users. In order to counter interference or congestion, it is useful to have situational awareness that detects and characterizes the problem and its location, and it is further useful to employ mitigation strategies (e.g. Dynamic Spectrum Access, Spectrum Aware Routing, Network Slicing). The present disclosure relates to a wide variety of use cases including space communications, communications for federal agencies, communications for defense applications, as well as wide variety of homogeneous and heterogeneous communications architectures including terrestrial 4G/5G/6G, Wi-Fi, Satellite Communications (SATCOM), Optical Fiber communications and combinations thereof.

FIG. 1A-D illustrate various aspects a non-limiting example of a heterogenous multi-vendor architecture deployed for enabling space communication according to some aspects of the present disclosure.

Figure 1A:
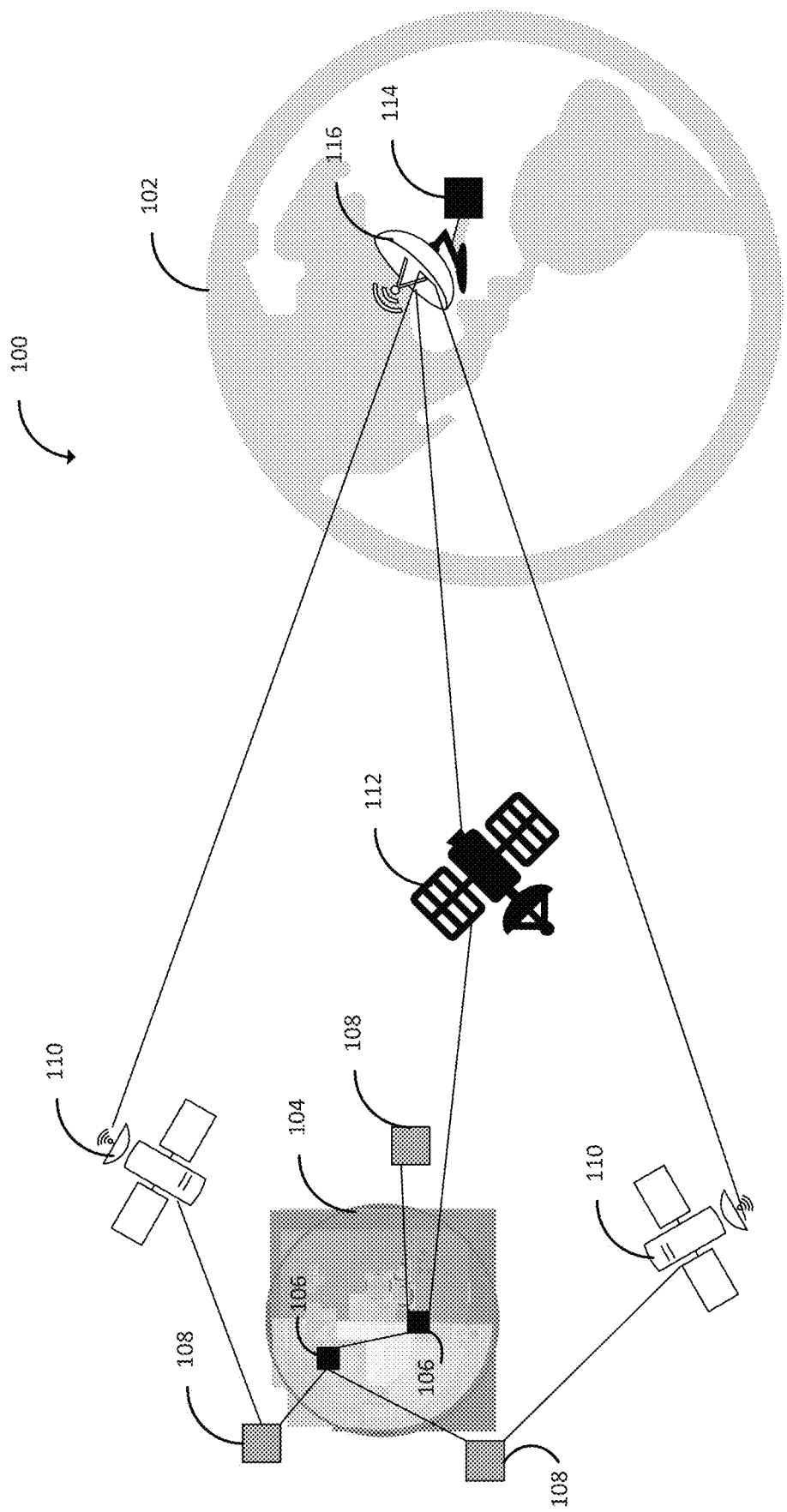

Shown in FIG. 1A is an example environment 100 formed of planet Earth 102 and the Moon 104. In this environment, one or more endpoints on the surface of the moon 104 such as devices 106 (may be referred to as one or more moon bases) may be communicatively coupled to one or more orbital command centers (orbital relays) 108, which in turn are communicatively coupled to one or more satellites 110 orbiting around the moon 104, and/or a main space station 112. Each of satellites 110 and space stations 112 may be communicatively coupled to one or more earth stations 114 via a ground-based receiver 116.

While not shown in FIG. 1A, there may be one or more additional endpoints such as Internet of Things (IoT) devices utilized on the surface of the moon that may be communicatively coupled to device 106. Similarly, there may be one or more additional endpoints such as smartphones, tablets, IoT devices, etc. on the Earth 102 that may be communicatively coupled to earth station 114 and/or receiver 116.

In example of FIG. 1A, communications links on the moon 104 can include proximity links from the devices 116 to orbital relays 108, relay-to-relay links between orbital relays 108, links between orbital relays 108 and satellites 110 and/or 112, direct-to-Earth (DTE) links from orbital relays 108 and/or satellites 110/112 to ground station 114, etc. The communications links are likely to operate in many frequency bands. As an example, the proximity links can operate in the S-Band and the Ka-Band. Relay-to-relay links can operate in the Ka-Band, or they may be optical. DTE links may operate in X-Band, Ka-Band and/or they may be optical. Each Band may include a plurality of channels.

These example communication links may be used to provide any type of know or to be developed services such as network communications (COM) that can enable users to transfer data to other nodes using addressable and routable data units. Primary COM services are real-time critical data transmission, data aggregation and transmission in a store-and-forward mode, and messaging. User applications can be networked-based, using either Delay/Disruption Tolerant Networking (DTN), Bundle Protocol (BP) or Internet Protocol (IP). The standardized messaging services can be utilized by applications such as service acquisition, PNT, and alerts.

Another example service can include Position, Navigation, and Timing (PNT) services for users on the Moon 104 as well as for the proximity links. The PNT services can enable the users to determine the position and velocity of an orbiting or the lunar surface-based asset using reference signals.

Another example service can include Detection and Information (DET) services that can provide alerts and other critical information to users. This can be used to enhance situational awareness of the users which may include astronauts, rovers, and other assets on the lunar surface. DET service can also alert the users of potentially dangerous solar activity. These alerts may be enabled using smartphones that use Wi-Fi™ and 4G/5G/6G networks that may be deployed on the lunar surface. DET services can also include a lunar search and rescue capability (LunaSAR).

Another example service can include Science (SCI) services that may enable various researchers to conduct measurements and experiments on the lunar surface. Some other uses of the SCI service can include radio astronomy enabled by the radio telescope on the lunar surface.

These communication links are likely to suffer a wide variety of impairments. These impairments can include, but are not limited to, distributed sources of interference on the Earth 102, misconfigured radio on the lunar surface trying to communicate on the same channel as an authorized user creating co-channel interference, solar flares creating Radio Frequency (RF) interference in many bands which are otherwise used, unintentional or intentional interference on the lunar surface due to an un-accounted device, intentional interference from an adversary, network congestion due to traffic overload, Distributed Denial of Service (DDoS) attack causing buffers to overflow, etc.

Existing communication networks are designed to optimize individual links and make them robust. While this approach works for simple missions where peer to peer connectivity is required (e. g. deep space probes to Earth, near-side of the Moon to the Earth), this is likely to be challenging for complex missions where there is no direct Line of Sight (LoS), and hence space-based networks need to be created. This results in a complex network including Orbital Relays, Gateways, CubeSats for PNT and SCI Services and the surface activities on the Moon. The mission is further complicated by the fact that many countries are planning to participate. Each country is likely to bring its own payload, use disparate spectrum bands and their own versions of security and encryption techniques. Missions may involve organizations such as universities wanting the SCI return data or access to the sensors for some experiment. This creates tremendous security risks. Dynamic Spectrum Access, Spectrum Aware Routing, and Network Slicing are some of the strategies that may be used to mitigate impairments described above. Network Slicing is a network architecture that enables the multiplexing of virtualized and independent logical networks on the same physical network infrastructure. Each network slice is an isolated end-to-end network tailored to fulfill diverse requirements requested by a particular application.

The present disclosure presents solutions to these challenges. More specifically, disclosed herein are solutions that provide an Intelligent Network Slicing and Policy-based Routing Engine (INSPiRE) module that may be used in conjunction with a Cross Layer Cognitive Communications Architecture and Intelligent Routing Engine (CLAIRE) which enables automated interference and congestion awareness and mitigation. CLAIRE is an intelligent agent-based solution that can be run on a device or within the network and automates the management and provisioning of the network. CLAIRE mitigates interferences & congestion and ensures that the desired QoE is maintained.

CLAIRE cognitive communications architecture is enabled using a cognitive control plane that enables situational awareness and helps to coordinate interference mitigation and network congestion. Cognitive control plane is implemented using Heartbeat (HTBT) messages between nodes within the network. Some nodes may have a wide-band RF Sensing Device. CLAIRE includes an RF sensing module, Cross Layer Sensing (CLS), a CLAIRE Decision Engine (CDE), and an intelligent Packet Forwarding Engine (PFE).

The CLS receives RF, Physical Layer (PHY), Medium Access Control (MAC) Layer, and Network Layer (NET) statistics to detect and characterize the causes of network impairment (e. g. solar flare). Based on these statistics, RF sensing employs a wide variety of techniques including Cyclostationary Signal Processing (CSP), and CLS employs Machine Learning (ML) to detect and characterize the cause of network degradation. CDE then acts on this information to implement a mitigation strategy. The CLAIRE cognitive control plane enables Dynamic Spectrum Access (DSA) to mitigate the interference and spectrum aware routing to mitigate network congestion. RF sensing enables selection of optimal backup channels, spectrum awareness, and troubleshooting; Congestion control is taken care of using spectrum aware packet forwarding/load balancing. Finally, a CLAIRE application User Interface helps with troubleshooting and visualization. The CLAIRE cognitive control plane is instantiated at the Application Layer (APP) so that it can ride on any transport protocol used by the underlying network(s). Also, this architecture may be applied to any other future military, commercial, terrestrial, wireless, or space missions since changes may be made easily. CLAIRE provides an extensible protocol that allows passing of RF spectrum situational awareness, cross-layer sensing, delay tolerant networking, and dynamic spectrum access information that can help with network optimization. The intelligent PFE enables spectrum aware routing to mitigate network congestion. PFE may consider a capacity of each link and a differential buffer backlog to then select the optimal link and route that packets should take based on the desired QoS.

CLAIRE and various aspects of operations thereof have been fully described in U.S. application Ser. No. 17/933,452 titled "SYSTEM AND METHOD FOR INTERFERENCE MITIGATION AND CONGESTION CONTROL THROUGH CROSS LAYER COGNITIVE COMMUNICATIONS AND INTELLIGENT ROUTING," the entire content of which is incorporated herein by reference.

As will be described in more detail below, INSPiRE module can include a Packet-type Inspection and Sorting (PTIS) module, a Policy-based Packet Scheduler (PPS), Prioritized Packet Buffers (PPB), an INSPiRE Agent, and a Delay Tolerant Networking (DTN) cache. The INSPiRE module can prioritize the packet types based on a given policy that is provided by the INSPiRE Agent and helps to orchestrate a Network Slice.

CLAIRE and INSPiRE can be hardware agnostic and apply to any radio or a network element such as a switch or a router. In other words, CLAIRE and INSPiRE can be application-based solutions that can run on any network node such as network devices 106, orbital relays 108, satellites 110, space station 116 (and one or more communication components thereof), earth station 114, receiver 116, etc.

In some examples, CLAIRE can perform spectrum aware packet prioritization, whereas INSPiRE can perform policy-based packet prioritization. CLAIRE and INSPiRE, when operating in conjunction with one another, can allocate network and spectrum resources for various data communication services and tasks in a heterogeneous multi-vendor network architecture. As will be described in more detail below, management and prioritization of communications maybe based on a number of factors including, but not limited to, needs of various organizations, missions, Applications, services to obtain the desired performance (e.g. Quality of Service), etc.

As will be described in more detail below, INSPiRE (1) enables organizing data streams into network slices where each slice has a defined IP address range and a corresponding max-min. Network slices are logical constructs with unlimited availability (different levels of priority, organizations, missions etc.), (2) enables determining the RF quality of every link in a terrestrial and/or non-terrestrial network. This includes the ability to get a real time feed from a system such as CLAIRE to determine the true bandwidth available; (3) enables determining the optimal set of paths (more than one) between nodes based on current orbital/topological position incorporating the true bandwidth; and (4) enables mapping network slices onto available paths across our non-terrestrial network. (1)-(4) provide a significant network optimization capability across a heterogeneous multi-vendor network.

Figure 1B:
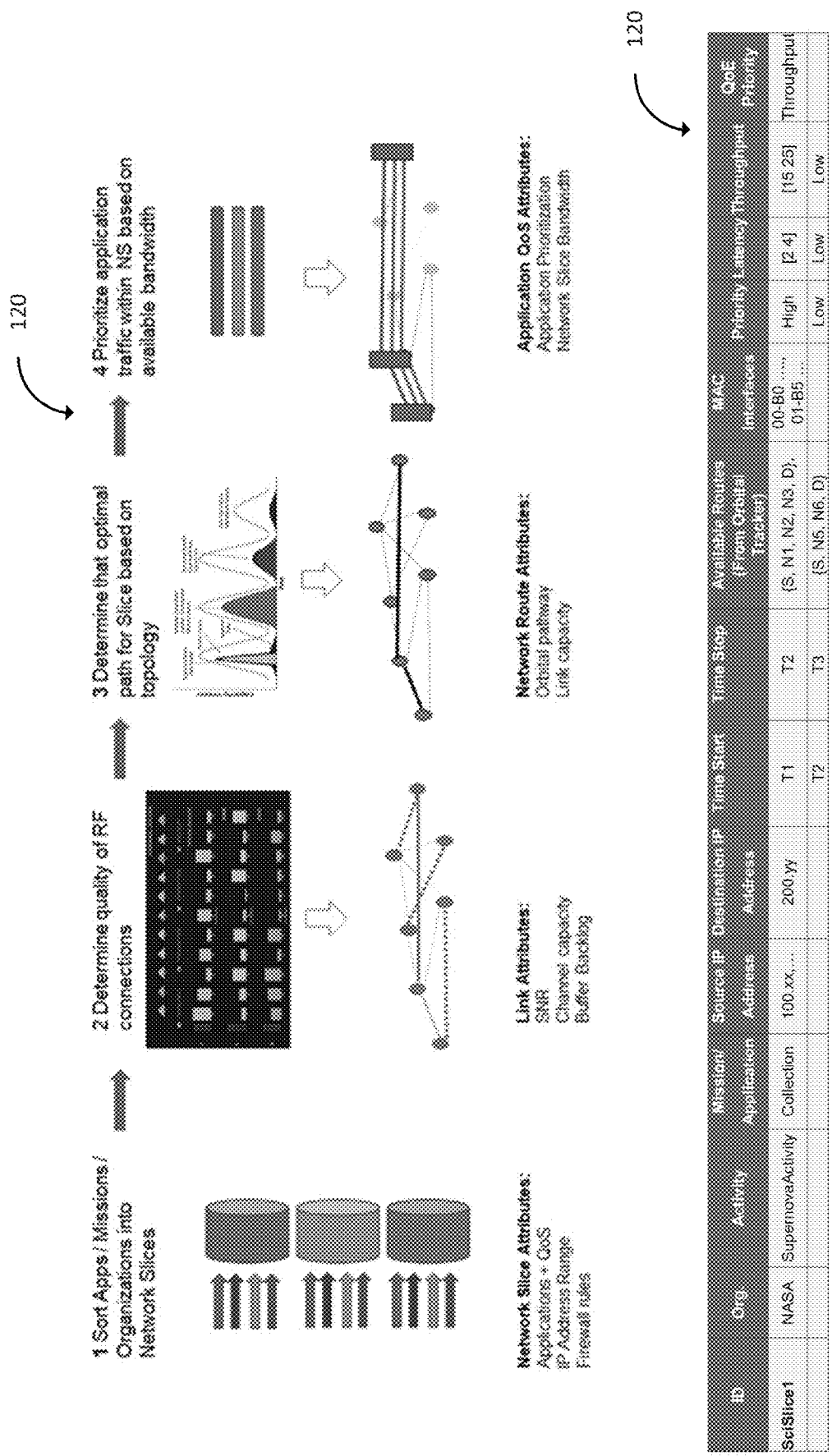

Model 120 of FIG. 1B illustrates an example network optimization model enabled by the INSPiRE architecture. An example definition 120 of a network slice is also provided in FIG. 1B.

INSPiRE model is able to continuously optimize changing conditions and described above. However, handling events that have no mathematical value (e.g., the entire reconfiguration of the network cannot be mathematically described due to a catastrophic events such as a Solar Flare) may be difficult. To handle catastrophic or complex events INSPiRE utilizes a 5th process (in addition to (1)-(4) above). This process, as will be further described below, is based on using an AI interference engine with natural language processing which can be called on demand.

Figure 1C:
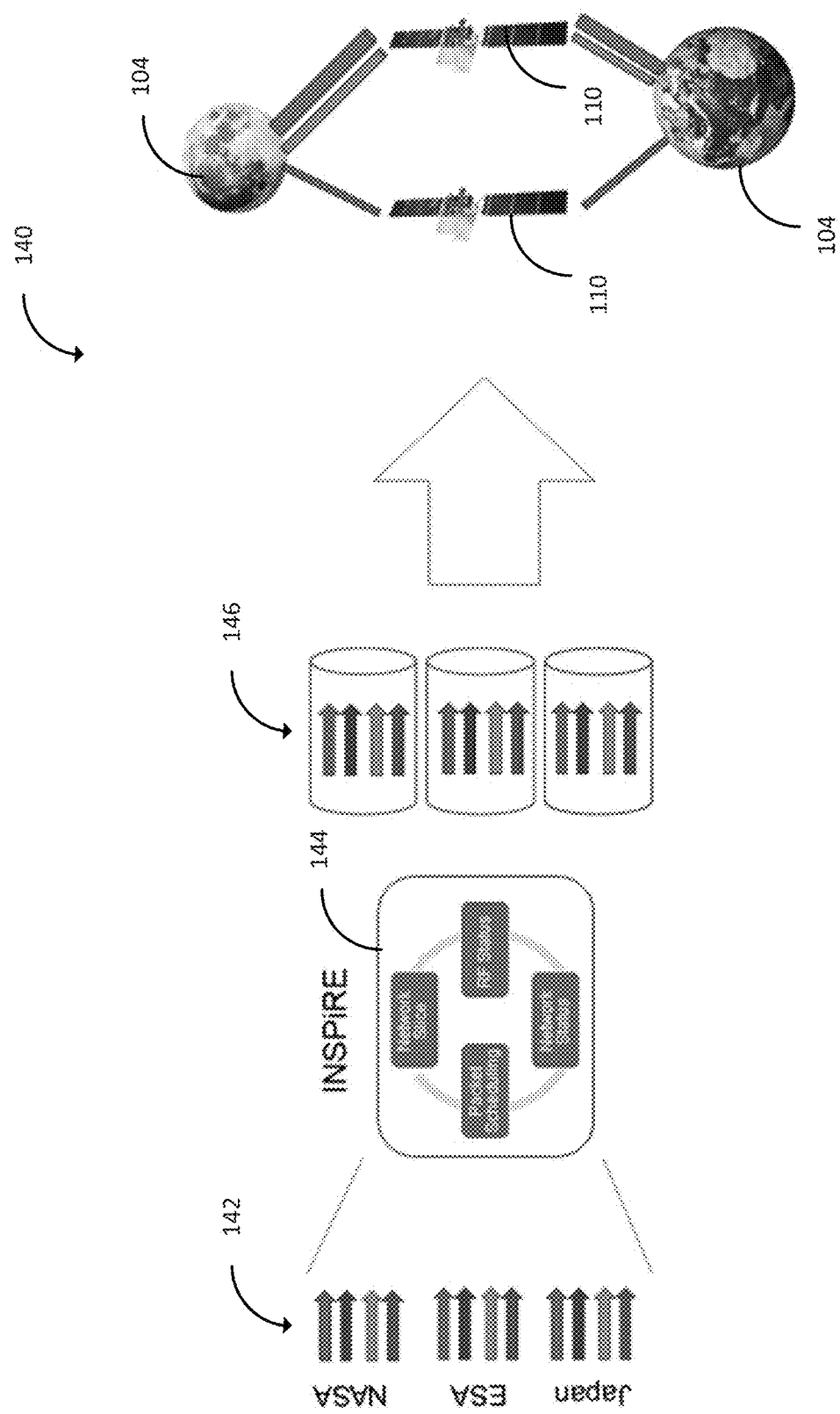

Schematic 140 of FIG. 1C illustrates a simple example of this AI based process. As shown, traffic from three example organizations 142 (e.g., NASA, ESA, JSA) may be received moving across two satellite (e.g., two relays 110 and/or one or more relays 108). INSPiRE architecture 144 can sort the traffic into three example network slices 146, which may then be communicated between end devices (e.g., devices 106 on moon 104 and earth station 114 on earth 102). In some examples, there may be hundreds of applications and they may be treated as a set of network slices. Next INSPiRE has the NASA slice going to one satellite and the partner agencies to the second.

Figure 1D:
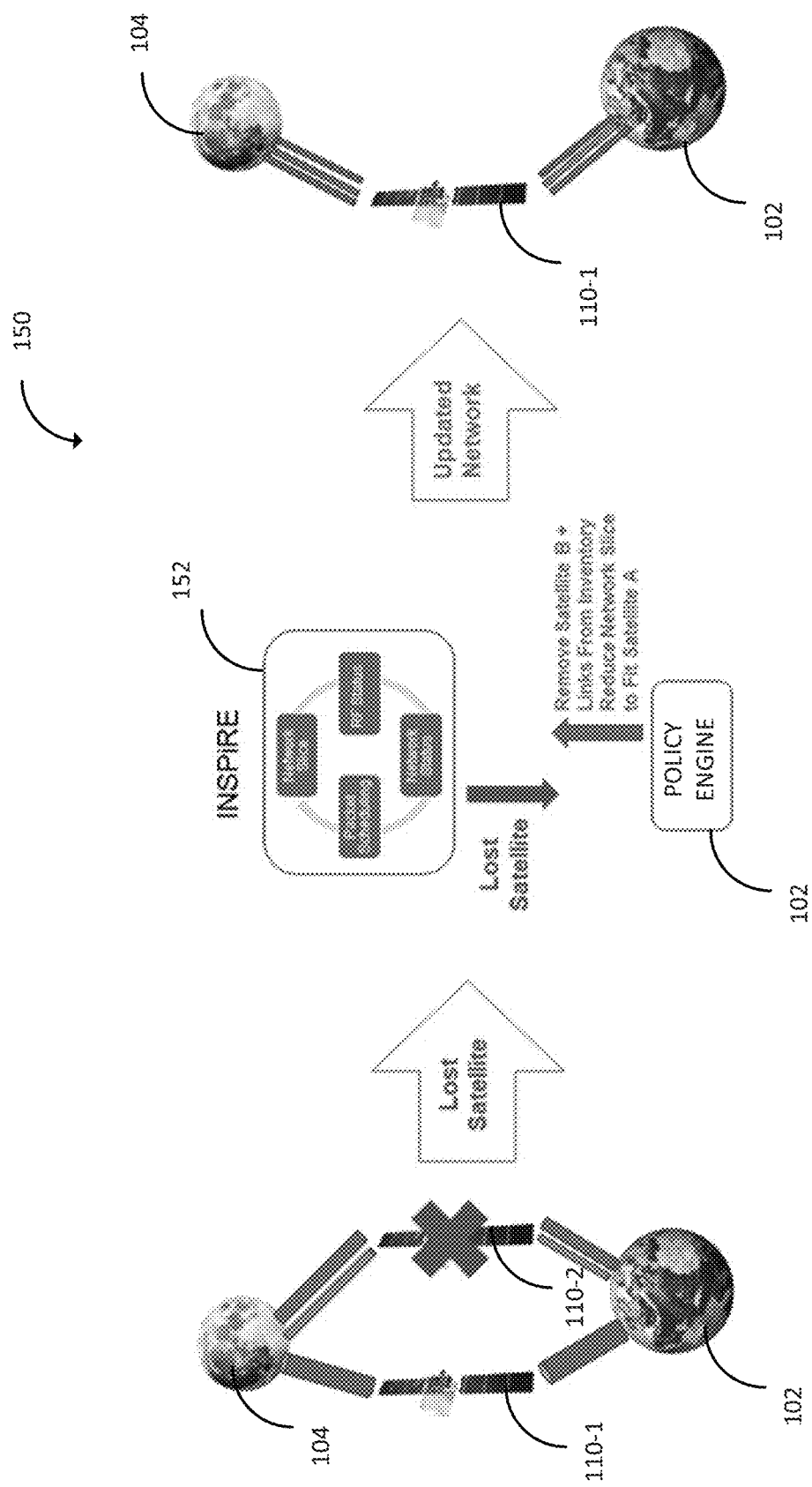

In some instances, there may be a failure of one of second satellite. FIG. 1D illustrates this example scenario 150 where one of satellites 110 has failed. The traditional approach to rebuilding routing would not be efficient as it require all applications to reconnect resulting in loss of critical data. Instead INSPiRE can utilize a policy engine to determine how best to handle such failure. In example of FIG. 1D, INSPiRE agent 152 can communicate with policy engine 154 that it has lost a satellite to which policy engine 154 can respond and instruct INSPiRE module 152 to (1) remove the routing entry and (2) re-route the network slice to use remaining satellite 110 while maintaining the min application value (i.e. only 2 network slices instead of hundreds of applications).

FIG. 2 illustrates an abstraction of inner-workings of a CLAIRE application and INSPiRE module, according to some aspects of the present disclosure.

Abstract architecture 200 illustrates an example INSPiRE module 202 that may be communicatively coupled two example CLAIRE applications 204 and 206 (CLAIRE 204 may be installed on and executed on satellite 110 and CLAIRE 206 may be installed on and executed on earth receiver 116).

In some examples, every network node (e.g., endpoint device, router, gateway, etc.) can have one instance of CLAIRE and one instance of INSPiRE module running thereon. In another example, while a CLAIRE module may be installed and executed on every node, an INSPiRE module may be installed and executed on a designated number of network nodes.

CLAIRE applications 204 and 206 may provide various information regarding a state of a particular communication link (e.g., RF state of the link) to INSPiRE module 202. As will be described below with reference to FIG. 3, INSPiRE module 202 may have sub-components such as network and RF state component 208 and a policy engine 210. Using component 208, policy engine 210, among other components that will be described below with reference to FIG. 3, INSPiRE module 202 may access a network slice inventory 212 comprising a number of available network slices that can be used for or dedicated to particular requested service.

In one example, each of slices A-E can be associated with a particular type of communication service (e.g., for exchange of control plane information and signaling, imaging applications, PNT maintenance, supernova, SCI, etc.).

A cognitive system (enabled by CLAIRE and INSPiRE) can sense, detect, adapt, and learn from its experiences and environment to optimize the communications capabilities for communication infrastructure including heterogeneous multi-vendor communication infrastructures. INSPiRE module disclosed herein both the mission and network operations burden, increase mission science data return, improve resource efficiencies and communication networks and ensure resilience in the unpredictable environments such as space.

As noted above, CLAIRE can provide distributed spectrum and network situational awareness to INSPiRE to enable link-layer selection, packet forwarding and optimization to maximize the data flow based on desired QoE requirements for different projects such as SCI, NET, DET, PNT services, etc., as described above.

In some examples, INSPiRE can over-ride the decisions made by CLAIRE since it knows the Policies and priorities of users requesting access to and use of a communication architecture (e.g., a heterogeneous multi-vendor network) at a particular time and it also has global operational picture. While CLAIRE engages in local link level optimization, INSPiRE engages in global optimization of the network to provide the Quality of Experience (QoE) to a wide-variety of users. CLAIRE Decision Engine 350 provides INSPiRE the RF and Link situational awareness. INSPiRE Agent 334 provides CLAIRE the flow down of the Network Policies. As a result of this, INSPiRE Agent may further restrict the network flow of packets via Policy-based Packet Scheduler if the network capacity is degrading. Furthermore, it can specifically instruct the Packet Forwarding Engine to transmit certain packets over certain communications modality. As an example, during interference or congestion situations, the INSPiRE Agent may reduce the priority of video applications such as Netflix and make those packets flow over Wi-Fi, while elevating the priority of Teleconference packets and make those packets flow over the 5G network. Similarly, CLAIRE ensures that INSPiRE is aware of the Link status and is not providing more traffic than it can handle, since otherwise this will lead to congestion.

From a logical perspective INSPiRE architecture can utilize (1) network topology, (2) RF performance and (3) policy-based priority to provide link-layer selection, packet forwarding and optimization. (1) and (2) may be provided by CLAIRE while (3) can be provided by any entity requesting usage of network resources for a particular underlying mission or objective. More importantly while the actual path optimizations are complex calculations, INSPiRE can abstract the paths as virtual Network Slices as shown in FIG. 2. The network slices are logical constructs utilizing a multiplexing header. INSPiRE can bring in the interesting aspects of 5G networks in the form of Network Function Virtualization (NFV), Security, Service Level Agreement (SLA) and Policy-based Routing (PBR), which allows a network operator to leap ahead from link-optimization to be able to create secure slices for each of its services. 5G network slicing is a network architecture that enables the multiplexing of virtualized and independent.

Each network slice (e.g., example slices A-E shown in FIG. 2) can be an isolated end-to-end network tailored to fulfil diverse requirements requested by a particular application. For this reason, this technology assumes a central role to support 5G mobile networks that are designed to efficiently embrace a plethora of services with very different Service Level Requirements (SLR). The realization of this service-oriented view of the network leverages on the concepts of Software-Defined Networking (SDN) and NFV that allow the implementation of flexible and scalable network slices on top of a common network infrastructure.

In some examples, each network slice can be administrated by a Mobile Virtual Network Operator (MVNO). The infrastructure provider (e.g., the owner of the telecommunication infrastructure) can lease out its physical resources to the MVNOs that share the underlying physical network. According to the availability of the assigned resources, a MVNO can autonomously deploy multiple network slices that are customized to the various applications provided to its own users.

Unlike 5G network slices which are bound to a specific class and support many applications resulting in not being able to cater to various needs of the Applications, INSPiRE network slices can be application specific and run across all paths over any network node/satellite constellation. To determine which path slice each particular traffic takes, the INSPiRE architecture can utilize the CLAIRE APP which is embedded on each system node to determine the topology and measure the RF performance. Collected data is uploaded to the INSPiRE management system where route optimizations may be determined. These optimizations may then be transmitted to all agents (on various network nodes) in charge of enforcing the policy decisions. Each Network Slice may be an end-to-end secure and logically separate tunnel, hence providing security and robustness.

FIG. 3 illustrates an example architecture of CLAIRE and INSPiRE Modules on a network node, according to some aspects of the present disclosure. In this instance a node j (or 302(j) as shown in FIG. 3) can be any of the devices 106, orbital relays 108, satellites 110, space station 112, earth station 114, and/or receiver 116 of FIG. 1 or any other router, gateway, and network endpoint in a communication network (e.g., a heterogeneous multivendor network). In this example node 302(j) may be one of orbital relays 108 that is required to forward a plurality of packets of data to Node k 302(k), which may be the earth station 114.

While FIG. 3 shows separate radios 304 with Transmit (Tx) functionality and Receive (Rx) functionality, the CLAIRE and INSPiRE functions are agnostic to this. This is simply for illustration purposes and architectures using Frequency Division Duplex (FDD) radios 304. However, embodiments of the present disclosure can also apply to Time Division Duplex (TDD) or Full Duplex (FD) Radios 304 using Simultaneous Transmit and Receive (STAR) technology.

In this particular case, node 302(j) may receive data packets 306 belonging to various service types—SCI, NET/COM, DET, PNT etc. Various traffic types are first segregated into various input buffers 308 (depicted as input buffers 308(1)-308(S)) as shown using Packet Type Inspection and Sorting (PTIS) Module 310.

The traffic types are then prioritized using multi-dimensional optimization by Policy-based Packet Scheduler (PPS) 312 based on network policies 314. Policies 314 may be defined based on Organization, Mission, Application, and Performance. FIG. 4 illustrates a non-limiting example of policies based on organization, mission/application, and performance metrics according to some aspects of the present disclosure.

Example 400 of FIG. 4 illustrates that policies can be set at an organization level 402 (e.g., NASA, European Space Agency, etc.), at a mission/application level 404, examples of which are shown in FIG. 4, and at performance metrics level 406 including, but not limited to, throughput, jitter, latency, packet error rate, etc.

One example of a policy 314 could be to prioritize SCI packets 306 from Lunar south pole during a supernova event. Another example of a policy 314 could be that during docking and descent, prioritize PNT packets 306. A third example of a policy 314 could be to prioritize DET and Control packets 306 during solar flares.

Prioritized packets 316 may then be forwarded to a plurality of Prioritized Packet Buffers (PPB) 318 (depicted as prioritized buffers 318(1)-318(P)). PPS Module 312 can prioritize packets 1, 3 and 6. Furthermore, PPS 312 can break packet 2 into 2A and 2B as shown in FIG. 3.

PPBs 318 may also serve as intermediate buffers. At this point, packets 316 are prioritized based on network policies 314. In case of link nonavailability, link degradation, interference, or network congestion, some packets 316 which are deemed to be less important are stored in the DTN cache 320 (e.g., Packet 2B), until the network capacity is restored, or congestion is mitigated. This indication is provided by CLAIRE 330 to INSPiRE 332 since CLAIRE 330 has situational awareness of the spectrum and the network.

INSPiRE Agent 334 can be configured to provide policies 314 to PPS 312 from INSPiRE control 336 (INSPiRE controller) which may be present in a cloud 338. These policies 314 define how the network slices are to be orchestrated to provide the desired QoE to the various services.

The CLAIRE Cognitive Control Plane may be orchestrated using various types of Heartbeat (HTBT) messages 340 and can enable DSA to mitigate the interference and Traffic Spectrum and Congestion aware Routing (TASCOR) to mitigate network congestion. CLAIRE Cognitive Control Plane is instantiated at the Application Layer (APP) so that it can ride on any transport protocol used by the network. Also, this architecture 300 may be applied to any other future military, commercial, terrestrial, wireless or space missions since changes may be made easily. CLAIRE 330 can provide an extensible protocol that allows passing of RF spectrum situational awareness, cross-layer sensing, delay tolerant networking, and DSA information that can help with network optimization. CLAIRE module 330 can continuously receive the spectrum and network situational awareness via HTBTs 340 that are generated and received by HTBT controller 342. As an example, there may be three or more different types of HTBTs 340—HTBT-REGISTRATION, HTBT-NORMAL, and HTBT-CRITICAL. HTBTs 340 contain Radio Frequency (RF), Physical Layer (PHY), MAC Layer, and NET Layer features which may be provided to Cross Layer Sensing (CLS) Module 344. The cross-layer features may include Noise Floor (NF), Signal to Interference plus Noise Ratio (SINR), Receiver Signal Strength Indicator (RSSI), Reference Signal Received Power (RSRP), Packet Error Rate (PER), Bit Error Rate (BER), Interference Detected notification from RF Sensing Module 346, etc.

CLAIRE RF sensing may employ Energy Detection and Cyclostationary Signal Processing (CSP). CLS can combine the RF Sensing and cross layer features from the radios 304 and can, optionally, use Machine Learning (ML) to detect and characterize the causes of network impairment (e.g., a solar flare). CLAIRE Decision Engine 350 then acts on this information to implement the mitigation strategy. RF Sensing enables selection of optimal backup channels, spectrum awareness, forensics, and troubleshooting. In one embodiment, RF Sensing may be enabled using Direct Digital Transceiver (DDTRX) technology.

Congestion control can be handled using TASCOR that is enabled using the intelligent Packet Forwarding Engine (PFE) 352. CLS module 344 can receives the SINR 354 at Node 302(j) via the HTBT messages 340. Based on this information and the Channel Bandwidth (B) in Hz, CLS module 344 can estimate the Capacity (C) of that particular link using, for example, the Shannon-Hartley formula: $C=B \log_2(1+SINR)$. PFE 352 takes into account the estimated capacity of each link and differential buffer backlog to create a utility function. PFE 352 can then select the transmit parameters such as which packets 316 from PPB 318 need to be transmitted using which radio interface 304 (i.e., by placing packets 316 into particular output buffers 358, depicted as output buffers 318(1)-318(L)), at what transmit power, and at what modulation and coding to maximize the utility. Hence, PFE 352 can provide an optimal link and the routes that those packets 316 should take to obtain the desired QoS.

In some aspects, packet buffers 318 and prioritization are dynamically changing based on real-time information from CLAIRE 330. This helps the network to perform congestion control and load balancing (e.g., when a solar flare knocks out all the S-Band Channels; in response, route all the traffic to the K-Band Channel). In this non-limiting example, PFE 352 can decide to forward Packets 1 and 2A to the K-Band Radio (by placing them in the top output buffer 358(1)). PFE 352 can also decide to transmit the HTBT 340, packets 4, 8, 9, and 5 using the X-Band Link (by placing them in the middle output buffer 358(2)). Finally, PFE 352 can decide to forward the HTBT and packets 6, 3, and 7 to the UHF-Band Radio (by placing them in the bottom output buffer 358(L)). Each output buffer 318(X) is associated with a respective link X (depicted as links 1-L) defined by a particular radio 304. Each link has one or more operational channels, depending on the capabilities of its respective radio. As depicted, each link X has $K_x$ operational channels. As an example, UHF radio 304 that implements link 1 may be capable of transmitting on 2 operational channels at once, so $K_1=2$.

Another function of CLAIRE is to orchestrate DSA when interference is present. This is once again enabled using HTBTs 340. If Node 302(k) on the Earth experiences interference, its SINR 354 can drop below a certain threshold value (which may be determined based on experiments and/or empirical studies). Also, its PER can increase beyond a certain threshold value (which may be determined based on experiments and/or empirical studies), and RSSI would increase above a certain threshold. Based on these indications, node 302(k) can send a series of Critical HTBTs 340 to the Node 302(j), requesting DSA. If the Node 302(j), receives N HTBTs 340, and M of those HTBTs 340 are critical, node 302(j) can decide to move the Transmit (Tx) channel of the affected Radio 304 (e. g. X-Band Radio) from its current Operating Channel to a Backup Channel. In the meantime, the Receive (Rx) Radio 304 on Earth does the same, and the link is re-established.

Hence, CLAIRE 330 and INSPiRE 332 not only ensure that the system maintains its QoS and QoE, but that it is also robust against interference and congestion. The CLAIRE APP User Interface helps with troubleshooting and visualization. CLAIRE Decision Engine 350 provides INSPiRE the RF and Link situational awareness. INSPiRE Agent 334 provides CLAIRE the flow down of the Network Policies.

In one embodiment, both CLAIRE 330 and INSPiRE 332 Modules may be implemented on a Graphics Processing Unit (GPU). In some other embodiment, CLAIRE 330 and INSPiRE 332 may be implemented on a Central Processing Unit (CPU). In another embodiment CLAIRE 330 and INSPiRE 332 may be implemented on a Field Programmable Gate Array (FPGA). In another embodiment CLAIRE 330 and INSPiRE 332 may be implemented on an Application Specific Integrated Circuit. It is possible that CLAIRE 330 and INSPiRE 332 are implemented on a combination of these different processor types.

FIG. 5 illustrates components of an example INSPiRE module according to some aspects of the present disclosure. INSPiRE architecture 500 may include a number of components that may either be physically within a given INSPiRE module (such as any one of INSPiRE Agents 1, 2, . . . K, where K is a positive integer equal to or greater than 2, or may be communicatively coupled thereto.

Existing routers assume a static network with changing applications. However, to properly manage application traffic a router must understand the 3D position of a network node, its connectivity strength, its bandwidth capability and priority and jitter/delay tolerance of all the applications that are requesting access. This is an extremely complex task at best, for example, in the non-limiting context of space communication as depicted in FIG. 1.

INSPiRE architecture 500 of FIG. 5 can solve this multi-dimensional connectivity challenge and function as an intelligent network splicing & policy-based routing engine.

As shown in FIG. 5, INSPiRE architecture 500 can include a number of components including policy engine 502 that may be cloud based or remotely located relative to any INSPiRE architecture 500 and be communicatively coupled thereto. Policy engine 502 can include a database of rules and policies that can be used, among others, for resolving issues related to prioritization of incoming network traffic, how they should be services, etc.

INSPiRE architecture 500 can further include one or more position tracking components 504 that can provide relevant position of (1) the network component (e.g., a router, gateway, etc.) on which the INSPiRE modules 514-1, . . . 514-K is/are installed, and/or (2) other network components in the communication network. Relevant position information can include spatial location and/or predictive movement of the network component(s).

INSPiRE architecture 500 can further include a slice service tracker 506. In one example, slice service tracker 506 can provide information including, but not limited to, real time RF and bandwidth measurements, application prioritization and jitter/delay tolerance data.

INSPiRE architecture 500 can further include a slice inventory 508, which can be the same as slice inventory 212 of FIG. 2 where a given slice may be identified and used for servicing a particular user for a particular application. Slices can be added to or removed from the active slice Inventory using policy engine 502. Each slice can have an ID, an associated organization, an associated activity, and associated application. In addition to these, the slices can have properties relating to how they should perform such as priority, latency, and throughput requirements. An overall QoE priority can be set for each slice to emphasize what performance characteristics are important.

Components 502, 504, 506, and 508 may be communicatively coupled to a network slicing engine 510 that determines appropriate network slicing and policy-based routing of network traffic based on various information provided by policy engine 502, position tracking component 504, slice service tracker 506, etc. Network slicing engine 510 may be remotely located relative to INSPiRE modules 514-1, . . . , 514-K (e.g., network slicing engine 510 can be located at earth station 114). In some examples, network slicing engine 510 uses information about the best possible network configurations (policy-unaware configurations), combines this with the information available from, slice inventory 508, policy engine 502, position tracking component 504, and/or slice tracker 506 to select and assign slices to routes and deploys specific routing instructions to each node.

Network slicing engine 510 may be interfaced with one or more INSPiRE modules 514-1, . . . 514-K, each of which may be the same as INSPiRE module 332 of FIG. 3 and installed and executed on any network node of, for example, network 100 of FIG. 1.

INSPiRE architecture 500 may further include an input component 512 in communication with network slicing engine 510 and configured to receive various inputs including commands (e.g., requests for access to network 100 for data transmission), control commands, and/or data for transmission.

INSPiRE modules such as INSPiRE modules 514-1, . . . , 514-K, in concert with CLAIRE application(s), solve the multi-dimensional routing problem in real time and at scale via a decentralized compute model. INSPiRE architecture 500 can achieve this solution by splitting the complex task into two parallel blocks (application and infrastructure management). First, INSPiRE architecture 500 can extend the 5G concept of a network slice to abstract out the application layer from the underlying network infrastructure. Next INSPiRE architecture 500 has a routing table that reflects the changing positioning of the routing nodes (e.g., node 302(j), 302(k), etc.) and the RF/link quality provided by components such as position tracking component 504, slice service tracker 506.

INSPiRE architecture 500 can then construct the optimal path for a specific application based on its priority and performance envelope. To dynamically change policies due to events and/or policy changes, INSPiRE architecture 500 can integrate an AI Inference Engine.

While INSPiRE is presented in the context of a space application, it can be equally applicable in other contexts to solve any complex network problem from routing traffic across drones and balloons to aircraft-to-aircraft-to-ground communications to even assisting first responders working in a flooded area who must discover and use whatever is available.

In some examples and will be further described below, INSPiRE modules and their functionality can further be enhanced by using trained neural network models and AI to dynamically determine the optimal packet forwarding decisions based on changing topology/orbital mechanics, changing RF conditions, changing application requirements and changing policies.

FIG. 6 illustrates a non-limiting example of resource allocation at the physical layer for different network slices determined by INSPiRE module of FIG. 5 according to some aspects of the present disclosure.

FIG. 6 shows how 5G flows down the Network (NET) requirements down to the Physical (PHY) Layer by allocating different portions of the Orthogonal Frequency Division Multiple Access (OFDMA) resource blocks such as resource blocks 600 to orchestrate Enhanced Mobile Broadband (eMBB) slice 602, Ultra Reliable Low Latency (uRLLC) slice 604, Massive Machine-type Communications (mMTC) slice 606, etc.

In some examples, rather than creating just three broad classes of Network Slices as in 5G, INSPiRE defines the network slice ontology using organization, mission/application, performance and service, as shown in FIG. 4. INSPiRE can autonomously detect changes in the network environment and make adjustments without human intervention.

A 5G network slice enables a 5G service provider to abstract 5G infrastructure for the purpose of creating different rate plans with different features (example low cost consumer without minimum quality versus premium enterprise clients connecting to cloud apps). INSPiRE extends the 5G network slice concept to represent applications, organizations and even events that would happen in a given mission. INSPiRE maps applications to network slices which in turn are dynamically mapped to dedicated output buffers to enable extremely fine-grained packet scheduling. This is how INSPiRE can send the NET requirements down to the PHY Layer and ensure that users receive the desired QoE.

In the example of space communication of FIG. 1, the goal is to make the best use of the utilized heterogeneous multi-vendor network among diverse and competing mission needs and traffic types while orchestrating these details away from the view of network users. Mission planners and users of the network have knowledge of the capabilities of the network when planning their missions but should be unburdened by planning specific details and coordinating the sharing of resources with other users. For instance, instead of each mission director scheduling data transfers on specific routes, through INSPiRE architecture of FIG. 5, one can summarize network resources, such as capacity, latency and path-diversity—both presently available and as predicted in the future—and the mission director will schedule an active slice for an appropriate time according to current policies and network resources available. The administrator should have excellent visualization tools for the network at large, for the multitude of slices, and their policies and their performance. Finally, when the slice is active INSPiRE can determine the optimal configuration of the network to achieve the performance of the slice.

The network configuration challenge—that is measuring, optimizing, and configuring—is not trivial. Measuring includes maintaining an inventory of all the assets in the network. It also requires good sensing data and aggregation of sensing data. Optimizing requires algorithms that consider historical data, make predictions about the future, and deal with potentially incomplete information. Configuring needs a method of communicating to each router on each node the instructions that implements policy.

Effective use of resources requires a unified approach to inventorying network assets. This orbital tracking system is important for the network, particularly a terrestrial-nonterrestrial network deployed for space communication such as that described above with reference to FIG. 1, to establish, at the very least, line-of-sight determinations.

An inventory of the network's resources extends far beyond position and line-of-sight. Radios and satellites may be controlled by different space agencies and may be compatible but need organizational efforts to connect. For example, not all of NASA's radios will necessarily be compatible. There must be compatibility at the PHY and LINK protocol layers. Radios must operate on the same band, use the same modulation and coding, and use the same MAC protocol.

Directionality of transmit and receive antennas also are relevant regarding feasibility along with the coordination costs such as time or energy of reconfiguring nodes. Storage, compute, and power capabilities of nodes must also be inventoried. A space network is a delay tolerant network, which means storage capacity is vital to avoid losing data. Nodes with limited computing hardware will not be able to carry out as complicated routing decisions. A node may not even have a cognitive agent controlling it. Lastly, power capabilities are relevant for controlling inter-network interference and link capacity as well as being another constraint on compute and configuration capabilities.

CLAIRE can measure, optimize, and configure the Lunar Network at the link level using wideband sensing, the CLAIRE cognitive agent, and a cognitive control plane message protocol. CLAIRE provides data to INSPiRE as well as being the cognitive agent carrying out the network level and policy-based decisions INSPiRE makes. One component is CLAIRE's wideband sensing and DSA capabilities to optimize a link. This means that CLAIRE can report the capacity of a link to INSPiRE with assurance that it is the best possible capacity. CLAIRE will also report network statistics such as buffer backlogs for each network slice. These pieces of information can help INSPiRE modules good network-wide decisions. INSPiRE will also have the capability to take in much more information than a human could consume and mine the data in order to find potentially unexploited optimizations.

Unlike terrestrial networks like the Internet and Cellular backbones, the links between nodes in the a heterogeneous network (such as one deployed in space) can come and go. The feasibility of a link requires, at a minimum, line-of-sight between the nodes. This can be computed with orbital tracking and geometry, by measuring (a) the angle above the horizon on the moon, (b) the angle above the horizon on the earth, and (c) any intersection between the moon and the path between the nodes.

INSPiRE can detect changes in a given environment and then act upon those changes to determine optimal network slice and perform traffic routing. For example, INSPiRE can receive data on the RF quality of a multiple connections and then decide which link to utilize or dynamically change the encoding to optimize throughput. However, one of the big challenges with dynamic route changes is detecting false positives and negatives.

Prediction is vital for making optimal decisions. For instance, orbital mechanics in a space deployed network means that the system is always changing. To coordinate routing handoffs, the system needs awareness of where nodes will be in the future. Prediction can also assist in accurately determining whether a link is fail or is only experiencing temporary interruptions. This sort of problem could be solved by collecting historical data and applying ML techniques to long-term behavior of the network. Deep learning has the potential to process large amounts of data and create a complex and unified decision-making scheme. ML can also help with making decisions when the number of choices is very large. INSPiRE's architecture can be structured in a way similar to a typical reinforcement learning problem which includes an agent, an environmental state, a set of actions, a way to update the state, and a reward in response to an action. This will be further described below.

The cognitive control plane will allow INSPiRE to update cognitive agents at the nodes with any new routing instructions. This may be through regular heartbeat messages. These agents will then execute the routing algorithm according to the framework it is operating in. One component of this architecture is that each cognitive agent need not have awareness of an entire system model to perform routing that makes the system perform as desired. For instance, each router may be highly configurable dependent on a large number of parameters. These parameters will be updated with INSPiRE's message.

As mentioned above, trained neural networks and ML techniques to dynamically perform network slicing and policy-base routing of network traffic in a heterogeneous multi-vendor communication network. Deep learning models may be deployed to optimize the machine learning coefficients to ensure the optimal output. To generate data to feed the deep learning model, there will be a high-resolution simulation of all of the network elements, orbital positions, applications, and/or RF environments. This high-resolution simulation would generate boundary cases where deep learning can be used to develop the optimal coefficients and thus solution.

FIG. 7 illustrates an example neural network that can be utilized by INSPiRE modules to perform network slicing and policy-base routing of network traffic in a heterogeneous multi-vendor communication network according to some aspects of the present disclosure.

Architecture 700 includes a neural network 710 defined by an example neural network description 701 in rendering engine model (neural controller) 730. Neural network 710 can be used for the dynamic spectrum allocation described above with reference to step 804 of FIG. 8. Neural network description 701 can include a full specification of neural network 710. For example, neural network description 701 can include a description or specification of the architecture of neural network 710 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 710 includes an input layer 702, which can receive input data including, but not limited to, identification of all of the network elements, orbital positions of devices, relays, satellites, routers, gateways in the network, applications, and/or RF environments, as described above. Additional input can include information on organizations using network 100 (currently or in the past), events (e.g., Solar Flare), applications utilizing network 100 for transmission (currently and/or in the past), present and past performance of network routes and functions, etc.

Neural network 710 includes hidden layers 704A through 704N (collectively "704" hereinafter). Hidden layers 704 can include n number of hidden layers, where n is an integer greater than or equal to one. The number of hidden layers can include as many layers as needed for a desired processing outcome and/or rendering intent. Neural network 710 further includes an output layer 706 that provides as output, predicted future use/transmission of signals in a shared frequency band by one or more (or all) UEs of various systems utilizing and cohabitating in a shared frequency band. This output may be based on processing performed by hidden layers 704. Output of network 710 can be prediction of future utilization and/or events affecting availability of network resources, a corresponding network slice selection based thereon, and/or policy-based routing decisions.

Neural network 710 in this example is a multi-layer neural network of interconnected nodes. Each node can represent a piece of information. Information associated with the nodes is shared among the different layers and each layer retains information as information is processed. In some cases, neural network 710 can include a feed-forward neural network, in which case there are no feedback connections where outputs of the neural network are fed back into itself. In other cases, neural network 710 can include a recurrent neural network, which can have loops that allow information to be carried across nodes while reading in input.

Information can be exchanged between nodes through node-to-node interconnections between the various layers. Nodes of input layer 702 can activate a set of nodes in first hidden layer 704A. For example, as shown, each of the input nodes of input layer 702 is connected to each of the nodes of first hidden layer 704A. The nodes of hidden layer 704A can transform the information of each input node by applying activation functions to the information. The information derived from the transformation can then be passed to and can activate the nodes of the next hidden layer (e.g., 704B), which can perform their own designated functions. Example functions include convolutional, up-sampling, data transformation, pooling, and/or any other suitable functions. The output of the hidden layer (e.g., 704B) can then activate nodes of the next hidden layer (e.g., 704N), and so on. The output of the last hidden layer can activate one or more nodes of output layer 706, at which point an output is provided. In some cases, while nodes (e.g., nodes 708A, 708B, 708C) in neural network 710 are shown as having multiple output lines, a node has a single output and all lines shown as being output from a node represent the same output value.

In some cases, each node or interconnection between nodes can have a weight that is a set of parameters derived from training neural network 710. For example, an interconnection between nodes can represent a piece of information learned about the interconnected nodes. The interconnection can have a numeric weight that can be tuned (e.g., based on a training dataset), allowing neural network 710 to be adaptive to inputs and able to learn as more data is processed.

Neural network 710 can be pre-trained to process the features from the data in the input layer 702 using the different hidden layers 704 in order to provide the output through output layer 706. In an example in which neural network 710 is used to predict usage of the shared band, neural network 710 can be trained using training data that includes past transmissions and operation in the shared band by the same UEs or UEs of similar systems (e.g., Radar systems, RAN systems, etc.). For instance, past transmission information can be input into neural network 710, which can be processed by neural network 710 to generate outputs which can be used to tune one or more aspects of neural network 710, such as weights, biases, etc.

In some cases, neural network 710 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 710, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 710 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 710 can perform a backward pass by determining which inputs (weights) most contributed to the loss of neural network 710, and can adjust the weights so that the loss decreases and is eventually minimized.

A derivative of the loss with respect to the weights can be computed to determine the weights that contributed most to the loss of neural network 710. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

Neural network 710 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, neural network 710 can represent any other neural or deep learning network, such as an autoencoder, a deep belief nets (DBNs), a recurrent neural networks (RNNs), etc.

Next, an example process of slice selection and policy-based routing is described.

FIG. 8 illustrates an example process for network slice selection and policy-based routing according to some aspects of the present disclosure. The process described below will be from the perspective of network slicing engine 510 of INSPiRE architecture 500 of FIG. 5. In another example, the process can be performed from the perspective of network slicing engine 510 of INSPiRE architecture 500. FIG. 8 will also be described with respect to the non-limiting example network of FIG. 1.

At step 800, network slicing engine 510 construct a network topology for network 100. This network topology can be constructed based on inputs from the resource inventory and orbital tracker (e.g., position tracking 504 of FIG. 5) followed by performing line of sight calculations such position tracking 504. Additionally, based on distance from the orbital tracker, network slicing engine 510 can determine link latency. From this set of possible links, network slicing engine 510 can identify a narrower set of feasible links by taking in compatibility constraints, directionality constraints, and other possible constraints from slice inventory 508. Additionally, network slicing engine 510 can collect and fuse all sensing data for network 100. This can include sensing data on the RF scene (can be provided by CLAIRE application(s) 514-1 . . . 514-n), from which the capacities of potential links are determined. This results in a directed, weighted graph where the edge weights include capacity and latency values of feasible links. Az example of such network topology is shown in FIG. 9.

FIG. 9 illustrates an example of a network topology construct according to some aspects of the present disclosure. Network topologies 900 includes 5 Orbital Relays (R) (R1 to R5, which can be the same as relays 108 of FIG. 1), Moon Base (MB) on the far side of the moon (which can be the same as one of devices 106), and 6 Ground Stations (GS) on the earth (GS1-GS6, which can be the same as earth station 114). Using these orbital patterns, network slicing engine 510 performs line-of-sight calculations and formed a feasible links network topology. Topology 902 shows a network layered structure along with an end-to-end routes 902-1 and 902-2. Each of links 902-1 and 902-2 can be tagged with capacity and latency values (e.g., C1, L1, C2, L2). This representation is useful in conceptualizing the paths that data from the moon will take. However, this limited three-layer structure does not show relay to relay connections.

Topology 904 is an expanded layered approach to the network by duplicating the relay nodes, creating a "ghost node" (e.g., R*1 to R*5) of each relay (R1 to R5) which forms another layer. This is reminiscent of expanding the middle layer like an accordion, revealing the relay-to-relay connections. Each relay has a connection to its ghost node which is a zero latency and infinite capacity connection. With this approach, network slicing engine 510 can easily track end-to-end routes through the network that are either Moon Base to Relay to Ground Station routes or Moon Base to Relay to Relay to Ground station routes, or as visually seen as paths 904-1 and 904-2 paths, two links or three links. This layered approach can be advantageous because it gives an excellent visualization of available network routes.

At step 802, network slicing engine 510 may determine end-to-end route attributes for the network topology determined at step 800. These attributes can include, but are not limited to, total latency and link capacity.

In one example, network slicing engine 510 can enumerate all the potential routes in the network by representing a route as a tuple (N1, N2, N3, N4), where each Nn is a node at layer n, with n being an integer greater than or equal to 1. network slicing engine 510 can iterate through all possibilities and discard routes with links that do not exist. network slicing engine 510 can then measure the attributes of each route by, for example, summing the latencies along each link and taking the minimum capacity of all the links in that route.

At step 806, network slicing engine 510 can determine the "best" set of disjoint routes based on the end-to-end attributes of all routes. In this context, "best" can mean the highest capacity set of routes, but it may include other desirable characteristics such as a low latency path.

Because we assume that each relay can only establish one input and one output link, two routes are considered disjoint if they do not include the same relay (or ghost relay) in the path. There may be one or more nodes in the overall network that are exempted from this consideration such as bases on the moon (e.g., devices 106) and/or earth station(s) 114, which can transmit to as many relays that are in sight, or can received from any number of relays in sight.

Upon determining all possible disjoint paths, network slicing engine 510 can calculate the combined capacity of the network by summing the capacities of each route. This assumes that there is no interference from one active link impacting the capacity of another link. But assuming so, from this we can select the maximum capacity configuration of the network.

FIG. 10 illustrates an example of disjoint paths along with associated link capacities and latencies according to an aspect of the present disclosure. In one example, output 1000 is a visual output of the process performed at step 806.

The disclosed disjoint paths approach is not the only approach for determining a total capacity of a network. Another approach can be based on the maxflow problem, which is initiated with an edge-weighted graph with one node known as a source (e.g., the Moon Base 106) and another as a sink (e.g., a new node connected to all each stations 114). The weights on the edges of the graph represent the maximum flow (capacity) a link can allow. The maxflow problem can be solved by finding a flow on a graph (which is a function on the edges of the graph) that maximizes the source flow generated that reaches the sink. A maxflow problem can be solved using known or to be developed algorithms such as the Ford-Fulkerson algorithm.

The example process of FIG. 8 can be further strengthened by predicting network characteristics in the future. Such knowledge can result in making optimal routing decisions. Since orbital mechanics are well defined, example neural network described with reference to FIG. 7 can be utilized to predict when feasible links will appear and disappear. This is important because reconfiguring the network to opportunistically use a new link may not actually be useful due to the short-lived nature of the link and the costs in reconfiguration.

Prediction is also important to coordinate a routing path handoff scenario, which matters because of the latencies and distances involved and the importance of making sure that data in transit in space as electromagnetic transmit or receive antenna may have limited range of motion pivoting.

One of the advantageous aspects of INSPiRE is the virtualization of the network. Instead of having the network users coordinate the minutiac of routing and timing, INSPiRE, in conjunction with CLAIRE, can measure and summarize the properties of the network at large and apportion a slice of that to the user. Using the disjoint paths routing approach, network slicing engine 510 can calculate the total capacity of the network. This highlights what a network policy intends to do: apportion the resources of the network to users without awareness of the details. The challenge in doing so for the Lunar Network is that the network resources are highly variable, which requires prediction and measurement. While optimizing coverage of an orbital relay over the moon is one important goal, orbital design should also include non-local network effects. For instance, there is the possibility that a well-placed orbital relay will increase the capacity of the network not through increased direct line of sight connections with the moon but through greater path diversity.

Referring back to FIG. 8, at step 808, network slicing engine 510 can translate the determined paths and routing decisions into instructions for routers, relays, and/or otherwise various network components to implement. In one example, this may be done as follows:

At a given moment in time there is a vector q of size N representing the buffers of each traffic type in a router (e.g., a relay 108, or a router at earth station 114). Over a small time interval Δt the router has to choose how much data of each type it will transmit according to its link capacity. The amount of data it can transmit is Δt×C, where C is the capacity of the link, or C is the minimum capacity along the entire route if the router intends to avoid buffer build ups somewhere along the route. Mathematically, network slicing engine 510 can look for function (1):

$$f_{\Delta t}: R_{>0}^N \to R_{>0}^N \qquad (1)$$

which maps a vector of positive values to another set of positive values. Alternatively expressed as the changes in the buffers, the function is $Dq = f_{D_t}(q)$. The router cannot transmit a combined amount of data larger than the capacity of the link and cannot transmit more data of a given type than is in its buffers, which translates to the mathematical constraints (2):

$$\sum_i \Delta q_i \leq C_{route} \Delta t \text{ and } 0 \leq \Delta q_i \leq q_i. \qquad (2)$$

Finally, the router receiving the instructions should be efficient in that it is using all of its capacity (e.g., should transmit as much data as possible). This means that the following equation (3) must be satisfied.

$$\sum_i q_i \geq C_{route} \Delta t \Longrightarrow \sum_i \Delta q_i = C_{route} \cdot \Delta t \qquad (3)$$

With a process of identifies possible paths for data transmission through a heterogenous multi-vendor network, the disclosure now describes a process of determining a network slice for servicing a data transmission request and providing routing instructions based thereon.

FIG. 11 illustrates an example process of determining network slices and providing routing instructions according to some aspects of the present disclosure. Similar to the example process of FIG. 8, FIG. 11 will be described from the perspective of network slicing engine 510 of INSPiRE architecture 500 of FIG. 5. In another example, the process can be performed from the perspective of network slicing engine 510 of INSPiRE architecture 500. FIG. 8 will also be described with respect to the non-limiting example network of FIG. 1.

At step 1100, network slicing engine 510 may receive one or more requests for data transmission using network 100. A request may be received from a user/entity requesting access to network 100 for data transmission (e.g., a request for a space walk for maintenance of one or more satellites 110, space station 112; a request from a research institute performing scientific research on moon 104, etc.). Each request may identify the nature of activity for which the request is made (e.g., equipment maintenance, spacewalk, PNT, SCI, etc.). The request may also identify desired throughput, latency, etc.

At step 1102, network slicing engine 510 may identify the set of available (disjoint routes), per the process of FIG. 8, along with information on available network slices from slice inventory 508.

At step 1104, network slicing engine 510 may assign one or more of network slices identified at step 1102 to disjoint routes and create specific routing instructions for each node (e.g., devices 106, relays 108, satellites 110, space station 112, earth station 114, etc.) in network 100.

FIG. 12 illustrates an example schematic of how slices are assigned to different requests along with corresponding routing instructions according to some aspects of the present disclosure.

As can be seen from schematic 1200, a table 1202 is created, which lists every received request. For each request, a slice is identified, the user/entity from which a request is received is identified, the activity associated with each request is identified, a mission/application associated with each request is identified, a priority associated with each request is identified, a latency requirement for each request is identified, a requested throughput for each request is identified, and a QoE priority associated with each request is identified.

In essence, slice properties should describe the needs of the slice users. For instance, some applications, like file transfers, are highly tolerant of disruptions. However, other applications, like astronaut voice or video calls, or robotics, are much more sensitive to interruptions and require a minimum throughput. At the policy level, slices should be assigned to an organization and a mission. They should also be assigned to be an active slice or inactive slice. Priority may be set to deal with either too little capacity (doesn't meet minimum throughput requirements) or excess capacity (how to distribute extra capacities to slices beyond minimum throughput). There are many possible ways to assign slices to routes in a network.

A number of factors may be considered in assigning one or more slices to requests. For example, one factor can be the diversity of available paths. Even if the network has more capacity than is demanded of it, it is better to assign slices to multiple routes in case one route goes down to ensure end-to-end data packet delivery. This can also help with load balancing in a network. A second factor can be the minimum throughput requirements of a slice. The sum total of minimum throughput requirements on a route should not exceed the capacity of that route. If multiple routes are available, network slicing engine 510 may load balance minimum throughput requirements across routes so that each route has plenty of extra capacity to handle traffic higher than the minimum throughputs. If the sum total capacity of the network cannot meet the sum total of minimum threshold requirements, then network slicing engine 510 may determine which slices to drop (and may inform an administrator of network 100 accordingly).

A third factor can be latency requirements of each slice. For example, robotic slices should have the lowest latency possible in order to reduce the human-computer feedback loop. Similarly, voice and audio slices may have the best experience at low latencies. Lastly, the priorities and QoE can be additional factors to be considered.

To optimize among such competing factors, network slicing engine 510 may create a Utility Function and hence solve a discrete optimization problem. Such utility function can incorporate is the priority factor. The slice assignment problem may then be solved for the highest priority tier first. Then taking whatever resources are left over, continue down the priority chain. For the lowest priority (e.g., when resources run out) slices may be dropped or rescheduled.

A more expanded view of slice assignment may include assigning slices to multiple routes. Slices are not limited to being assigned to a single route. Slices that require resiliency can be broadcasted or duplicated onto multiple routes. Slices that require high throughput can be fragmented across multiple routes. An example of this is shown in FIG. 13 described below.

FIG. 13 illustrates three non-limiting examples of assigning slices to different requests according to some aspects of the present disclosure. Schematic 1300 illustrates three outputs 1302, 1304, and 1306, each representing a different configuration for slices of network 100 assigned to different requests. Output 1302 may be an example of data fragmentation where data from a single slice is sent on multiple routes in order to maximize throughput. For instance, this could be science data from a telescope observing a supernova. On the other hand, output 1306 can be an example of data duplication, where data is duplicated in order to increase the resiliency of a slice. For instance, this could be human life support traffic.

The utility function and the discrete optimization problem can be mathematically described as follows (also shown in FIG. 12). Let S be the set of slices and let R be the set of routes. From the set of routes R, slices are assigned to routes (e.g., find a function F:S→R). However, as discussed, this may get more complicated in reality. Slices may be assigned to multiple routes, such as in terms of redundancy or data fragmentation. In this case, a function may map slices to the power set of routes, which is the set of all subsets of R. That is, F:S→P(R), where the QoE element may impact how the slices are assigned. The map should consider the policy properties of the slices and can be used in a utility function formulation of the problem. Once slice assignments have been made, the specific routing instructions need to be created and sent to each router. Based on slice assignments, network slicing engine 510 can determine routing location. What remains is how to share the capacity between multiple types of traffic.

FIG. 14 illustrates two non-limiting examples of advanced slice assignments with different Quality of Experience goals according to some aspects of the present disclosure. In schematic 1400, example outputs 1402 and 1404 are shown. Output 1402 illustrates data fragmentation for a science slice in order to maximize throughput. Output 1404 shows data resiliency for a human life support slice in order to have failsafe communications.

Referring back to FIG. 11, at step 1106, network slicing engine 510 may determine routing instructions for data packets associated with each request based on table 1202 and the identified routes (per the process of FIG. 8). At step 1108, network slicing engine 510 may generate a visual output of routing instructions for data packets associated with each request using the determined one or more slices, as output 1206 shown in FIG. 12. This output may be presented on a dashboard of a user device of a network operator.

FIG. 15 provides an example table of routing instructions according to some aspects of the present disclosure. An non-limiting example of routing instructions is shown in table 1500 of FIG. 15.

As noted above, possibilities related to how best to assign network slices to different requests and then providing appropriate routing instructions can be high. For instance, extra capacity can be equally assigned to all slices, regardless of priority. Or priorities may determine weights for how this extra capacity is assigned. This is not a straightforward process. Many slices will transmit only slightly above their minimum throughput requirement, which means they may not need to use much of the extra capacity. The concept of trained neural networks and ML techniques described above may be utilized to aid network slicing engine 510 enhance its slice and path selection process by, for example, predicting an event (e.g., whether the fluctuating quality of a link is temporary or represents a soon to occur failure) and assisting in deciding from a large set of possible options (e.g., choosing slice assignments or specific routing decisions).

FIG. 16 illustrates an example architecture of an INSPiRE module with an embedded trained neural network component according to aspects of the present disclosure. While example architecture 1600 illustrates a subset of components of INSPiRE architecture 500 of FIG. 5, architecture 1600 is not limited to this example illustration and may include additional elements and component such as those described with reference to INSPiRE architecture 500 of FIG. 5.

As shown, architecture 1600 can include network slicing engine 510 and position tracking component 504 of FIG. 5. In addition, architecture 1600 may include a trained neural network component such as that described above with reference to FIG. 7. Architecture 1600 may further include satellite orbits database 1604 that can include information on orbital positions (e.g., current, scheduled, and/or historical orbital position of satellites 110 and/or space station 112 of FIG. 1). Such database may not be part of a given INSPiRE module 1600 but may be remote and communicatively coupled to position tracking components 508.

Information fusion component 1606 may interface with external components such as CLAIRE applications 514-1, . . . , 514-$n$ of FIG. 5, slice inventory 508, etc.

Utilizing trained neural network 1602, the state of the system is defined by the position of nodes and the observations from CLAIRE applications 514-1, . . . , 514-$n$. The actions are the routing decisions made by INSPiRE module 1600. The rewards may be defined by mapping the performance of the network to some value, which may also be filtered through policies. In some examples, such reward being depend on policy may entail retraining the system for each policy. Both prediction and decision making may be incorporated into the output of neural network 1602.

FIG. 17 illustrates an example network device according to some aspects of the present disclosure. Example of computing system 1700 of FIG. 17 can be used to implement one or more component of the example systems and architectures described above with reference to FIGS. 1-16 including, but not limited to, any component of system 100 of FIG. 1, INSPiRE architecture 500, etc. Connection 1705 can be connection connecting various components of the computing system 1700. For example, connection 1705 can a physical connection via a bus, or a direct connection into processor 1710, such as in a chipset architecture. Connection 1705 can also be a virtual connection, networked connection, or logical connection.

In some embodiments computing system 1700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1700 includes at least one processing unit (CPU or processor) 1710 and connection 1705 that couples various system components including system memory 1715, such as read only memory (ROM) 1720 and random access memory (RAM) 1725 to processor 1710. Computing system 1700 can include a cache of high-speed memory 1712 connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 can essentially be a completely self-contained computing system, containing multiple cores or processors, a bus, memory controller, cache, etc. A multi-core processor can be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms known to those of skill in the art. In some instances, multimodal systems can enable a user to provide multiple types of input/output to communicate with computing system 1700. Computing system 1700 can include communications interface 1740, which can generally govern and manage the user input and system output. There is no restriction on operating on any particular hardware arrangement and therefore the basic features here can easily be substituted for improved hardware or firmware arrangements as they are developed.

Storage device 1730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1730 can include software services, servers, services, etc., that when the code that defines such software is executed by the processor 1710, it causes the system to perform a function. In some embodiments, a hardware service that performs a particular function can include the software component stored in a computer-readable medium in connection with the necessary hardware components, such as processor 1710, connection 1705, output device 1735, etc., to carry out the function.

FIG. 18 illustrates an example network device suitable for performing switching, routing, load balancing, and other networking operations according to some aspects of the present disclosure. The example network device 1800 can be implemented as switches, routers, nodes, metadata servers, load balancers, client devices, and so forth.

Network device 1800 includes a central processing unit (CPU) 1804, interfaces 1802, and a bus 1810 (e.g., a PCI bus). When acting under the control of appropriate software or firmware, the CPU 1804 is responsible for executing packet management, error detection, and/or routing functions. The CPU 1804 preferably accomplishes all these functions under the control of software including an operating system and any appropriate applications software. CPU 1804 can include one or more processors 1808, such as a processor from the INTEL X86 family of microprocessors. In some cases, processor 1808 can be specially designed hardware for controlling the operations of network device 1800. In some cases, a memory 1806 (e.g., non-volatile RAM, ROM, etc.) also forms part of CPU 1804. However, there are many different ways in which memory could be coupled to the system.

The interfaces 1802 are typically provided as modular interface cards (sometimes referred to as "line cards"). Generally, they control the sending and receiving of data packets over the network and sometimes support other peripherals used with the network device 1800. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 1804) to efficiently perform routing computations, network diagnostics, security functions, etc.

Although the system shown in FIG. 18 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1800.

Regardless of the network device's configuration, it can employ one or more memories or memory modules (including memory 1806) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 1806 could also hold various software containers and virtualized execution environments and data.

The network device 1800 can also include an application-specific integrated circuit (ASIC), which can be configured to perform routing and/or switching operations. The ASIC can communicate with other components in the network device 1800 via the bus 1810, to exchange data and signals and coordinate various types of operations by the network device 1800, such as routing, switching, and/or data storage operations, for example.

Simulation Results several simulation approaches with different levels of fidelity have been developed. The highest level of fidelity would be a network simulation modeling radio links down to the PHY level. A decrease in the level of fidelity would be one that uses VMs, such as on a platform like the Azure cloud, or Docker containers that communicate through sockets. Here, the complete software stack and hardware interfaces can be modelled. Parallel in fidelity to this, would be using a network simulation library like ns-3, which also models at the level of tracking individual packets. Finally, the simulation approach we developed most thoroughly was a network-flow level simulation written from scratch in Python.

A VM or Docker approach has several considerations. Using Docker containers instead of VMs on Azure may be preferable because containers are lighter weight than full VMs. Azure VMs take time to turn on or turn off, which is relevant because we considered simulating reachability of nodes by turning VMs on and off.

Another technical consideration is what socket library to use. A lower-level standard library is not as easy to work with as ZeroMQ. Additionally, ZeroMQ is used in many technical stacks already, such as NASA's HDTN protocol. At this level, our approach to simulating the environment of the network would involve using an intermediary node known as an arbitrator which will simulate feasibility, the channel and other potential environmental features. For a large network simulation, we need a model of the environment controlled outside of the knowledge of each individual node. Additionally, setting up and destroying socket connections directly would be burdensomely complex. A big advantage of a Docker-like approach is that it may be easier to use a custom full protocol stack, like NASA's HDTN protocol, and consider aspects such as OS, hardware and network interfaces, than it would be using a network simulation tool like ns-3. While we explored lower-level simulations using sockets in Python, we settled on pursuing a more mathematical, higher-level network flow simulation in Python. The network flow simulations are intended to provide a good understanding of how routing decisions impact the entire network without managing individual packets.

Simulations conducted test how the network would behave when events occur which affect the capacity of different links in the network. This is aligned with the data that a potential reinforcement algorithm would receive, which would be network-level statistics instead of individual packets. Object-oriented approach is utilized in this simulation to represent the different components of the network. The entire network is represented by its own network class with individual components from classes such as node, link, application, route, and slice classes. Each node object in the network has a routing function which we designed in our model to be configurable with different routing approaches. Each node also kept track of queues for each slice. Links were defined by start and end nodes and also had a pipe or queue child element that kept track of the data currently in transit. Application objects generated data at some programmed rate. Route objects were defined by a list of links and slices were associated with routes along with other slice properties.

Initially, basic routing functions that did not consider policy were developed. This was then extended to more routing functions that did consider policy and position in the network. For instance, a moon base router such as a device 106 would ideally have enough transmitters to transmit to as many relays 108 as possible while a relay router would potentially be more limited. Then illustrative data from a previous orbital mechanics model developed were used as an input to the simulation. The structure and environment of the network were represented in a JSON simulation configuration file. This JSON file is intended to represent something like the data structure it will receive from CLAIRE over the cognitive control plane. For instance, they contained information about the number of links and their characteristics such as feasibility, distance, latency and capacity. Additionally, a JSON file to represent our slice inventory was created.

FIG. 19 illustrates an example table of JSON files according to some aspects of the present disclosure. Link information and slice inventory in JSON files are shown in table 1900.

Each slice has multiple fields, such as an ID, name, organization, mission, priority, minimum throughput requirement, latency requirement, Quality of Experience goal, and weighting factor, as described above as well. We expect the potential for many more possible fields. This data structure is intended to represent something like that which INSPiRE architecture 500 may receive from policy engine 502.

The structure of an example simulation is as follows. First, the configuration file is loaded for the network structure and environment and built the object-oriented model. Then the network features such as the best possible routes are calculated. Disjoint routes are then identified. Next, the slice inventory configuration file is loaded and used with the identified routes to make a decision on how to route slices. This slicing assignment is then translated into specific router instructions. Finally, a loop iterating over some small time step dt is ran where updated the network state incrementally is updated according to model rules. That is, $\Delta \vec{q} = f_{\Delta t}(\vec{q})$ is calculated and links (data in transit) and buffers (data received) are updated.

developed code handled a couple of technical challenges specific to our network flow approach. For instance, given that the distances in a lunar network are significant enough to affect latencies, delays are modeled by considering each link to be a pipe or queue which has data pushed into and data popped out of it each iteration. Another challenge particular to this network flow approach was constructing the routing functions to produce a mathematically correct output. For instance, checks had to be done so that queues for each slice are never negative. Another challenge was making sure that localized routing decisions based on queue sizes made progress towards the earth and did not get stuck in some infinite routing loop.

Finally, the histories of queues and network transfer were recorded, collected, and plotted. To calculate the average latency, the running values of the total data sent and the total data received are used. If S(t) is the total data sent and R(t) is the total data received, $\Delta t$ is solved for such that $S(t-\Delta t) = R(t)$ to get the latency. This has the disadvantage of increasing latencies when data gets stuck in the network.

Disclosed network flow simulation code is used to illustrate several scenarios. In all our scenarios, a similar grid of graphs is produced as shown in FIGS. 20-24. FIGS. 20-24 illustrate example outputs of slice selection and traffic routing according to some aspects of the present disclosure.

In each of schematics 2000, 2100, 2200, 2300, and 2400 of FIGS. 20-24, the top left graph shows the network topology and the routes that traffic of each slice is taking. The set of three graphs on the bottom are all plots of Mbps vs time. The bottom left graph shows the rate at which application data is being generated on the moon. The middle bottom graph shows what proportion of that application data is being transmitted by the Moon Base into the Lunar Network. The bottom right graph shows the amount of traffic that is finally received at NASA.

Not all application data generated is going to be sent over the Network if the total capacity of the network cannot handle it. Additionally, not all data sent over the network can be assumed to be received at the same time or received at all. Data taking different routes will have different travel times. Or data may be buffered in the network for a significantly long time or in a worst-case scenario even lost. Two more plots are relevant. The top middle plot shows the average latency of each traffic type. The top right plot shows the average amount of memory being used on the Moon Base (blue curve) and the total amount of memory being used on all the Relays (orange curve). If there is a difference between where data is buffered, whether on the moon or on the relays, is a consideration that needs to be made.

The schematics 2000, 2100, 2200, 2300, and 2400 are representative of what an administrator and policy manager of network 100 may observe on a dashboard of their device. There should be a high-level visualization of the network topology and active links, along with a multitude of information on the performance and patterns of each slice. With this results format, we illustrated several scenarios. The first scenario shows how a semi-intelligent router that is aware of queues would handle congestion on a link. The second scenario shows how an INSPiRE policy-based router would handle congestion on a link. The third scenario shows how INSPiRE would self-heal in a delay-tolerant way from temporary congestion. The final scenario shows how INSPiRE would make an intelligent decision reroute traffic when a non-temporary link failure has occurred.

In all scenarios shown in FIGS. 20-24, the same traffic patterns being generated is used. The lower left plot shows application data of several types being generated at a constant rate. In general, application traffic generated should not be assumed to be constant. But in this scenario, about 1.5 Mbps of Scientific Data, 500 kbps of Mission Stats Data, and <100 kbps of Command-and-Control Data, for a total of around 2 Mbps data, is being constantly generated.

Figure 20:
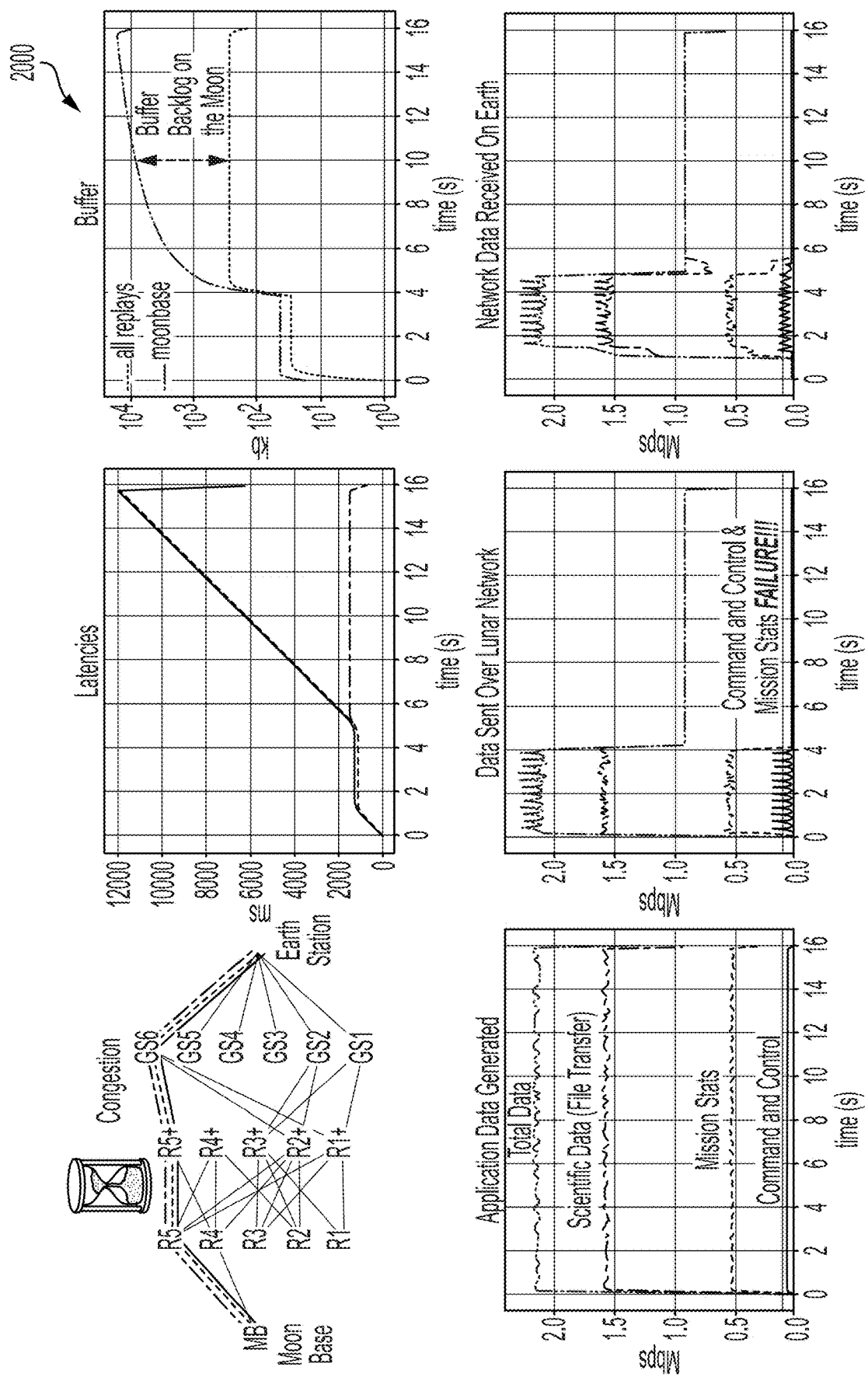

In the scenario corresponding to schematic 2000 of FIG. 20, a semi-intelligent queue-aware router would deal with congestion on a route. Here, it can be seen that all traffic of each type is assigned to a single route. It is seen as an "upper path" in the network topology graph. Traffic is being routed from the Moon Base (MB) to Relay 5 (R5), and then routed to Ground Station 6 (GS6). The horizontal portion of the route shows traffic remaining on Relay 5, but this is a conceptual trick to find all two-hop and three-hop routes. The middle link portion of the route has infinite capacity and zero latency. This semi-intelligent router does not consider relay to relay connections.

The semi-intelligent routing approach pays attention to queues by transmitting the data of whichever queue is the largest. This results in a zigzag or burst-like pattern of transmission. Traffic types with a lower generation rate take time to fill up their queue until it is of comparable size to the average queue size of the higher data rate traffic. At this point the router sees them as comparable routing priorities and transmits a burst of the lower generation rate data.

We see for the first four seconds that network 100 is transmitting all the application data generated. The system is in a stable steady state. All data in the network is received, though as seen in the lower right plot, the received data plot is a time-shifted version of the data sent over the network.

However, at time t=4s, the quality of the route degrades significantly, and it can no longer support all the traffic being generated. The memory being used on the moon increases substantially and results in a growing buffer backlog. Because data is not making it to the earth latencies skyrocket.

However, instead of taking a policy-based approach, by following its normal routing algorithm which prioritizes the traffic that is being generated the most, it crowds out the lower priority traffic. This means no mission stats and command and control data is being sent over the network and their latencies are shooting up. This can constitute a critical failure.

Figure 21:
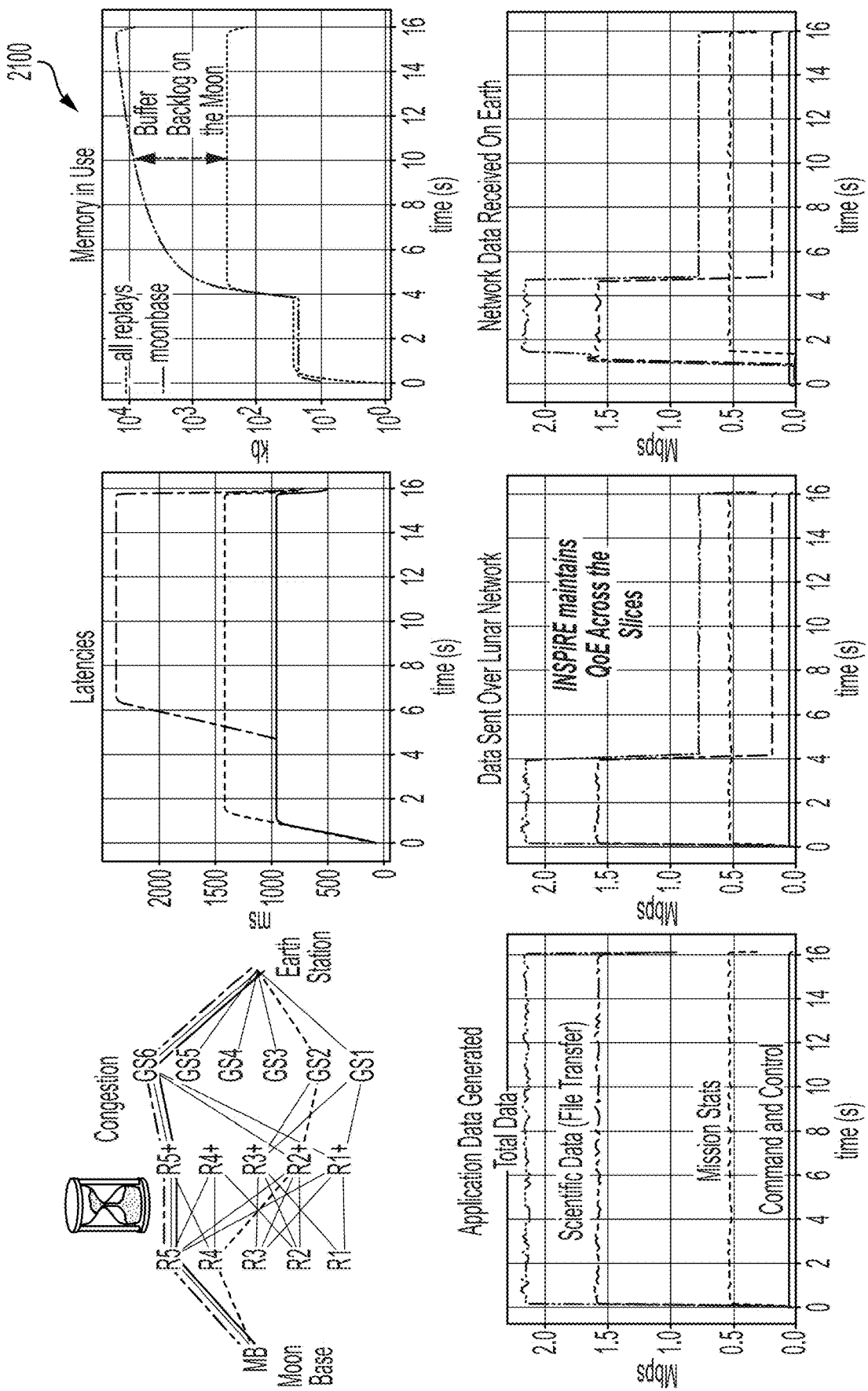

Schematic 2100 of FIG. 21 illustrates how INSPiRE module 500 can address the critical failure mentioned above.

First, INSPiRE module 500 considers relay to relay connections and diversifies traffic over multiple routes. This is good for several reasons, although it depends on the Moon Base containing multiple transmitters in order to transmit over multiple paths. But the value is that there is higher maximum throughput and greater diversity of paths so that any failures on one path will not affect failures on the other. In this case, while there is higher maximum possible throughput, because application demand is already being met by the network, there is no additional benefit aside from diversification.

Effects of path diversification can be seen in both the upper middle plot and the lower right plot where the data is being received at different times due to the different travel times along each path.

For the first four seconds the story is like the semi-intelligent router described with reference to FIG. 20. There is the same application data generation rate and the network is meeting demands. However, instead of the zig-zag pattern seen in the previous example, the transmission patterns are smoother because INSPiRE module 500 is policy-aware and stabilizes traffic.

However, when congestion hits at four seconds, several different things occur than in the previous scenario. First, because the congestion only hits the upper route, the mission statistics traffic on the lower route is unaffected. Second, on the congested route only the file transfer data's throughput is reduced. Command and Control data is maintained at the same data rate as before because INSPiRE is policy aware. Even though network capacity has reduced, critically important traffic is still getting through.

Figure 22:
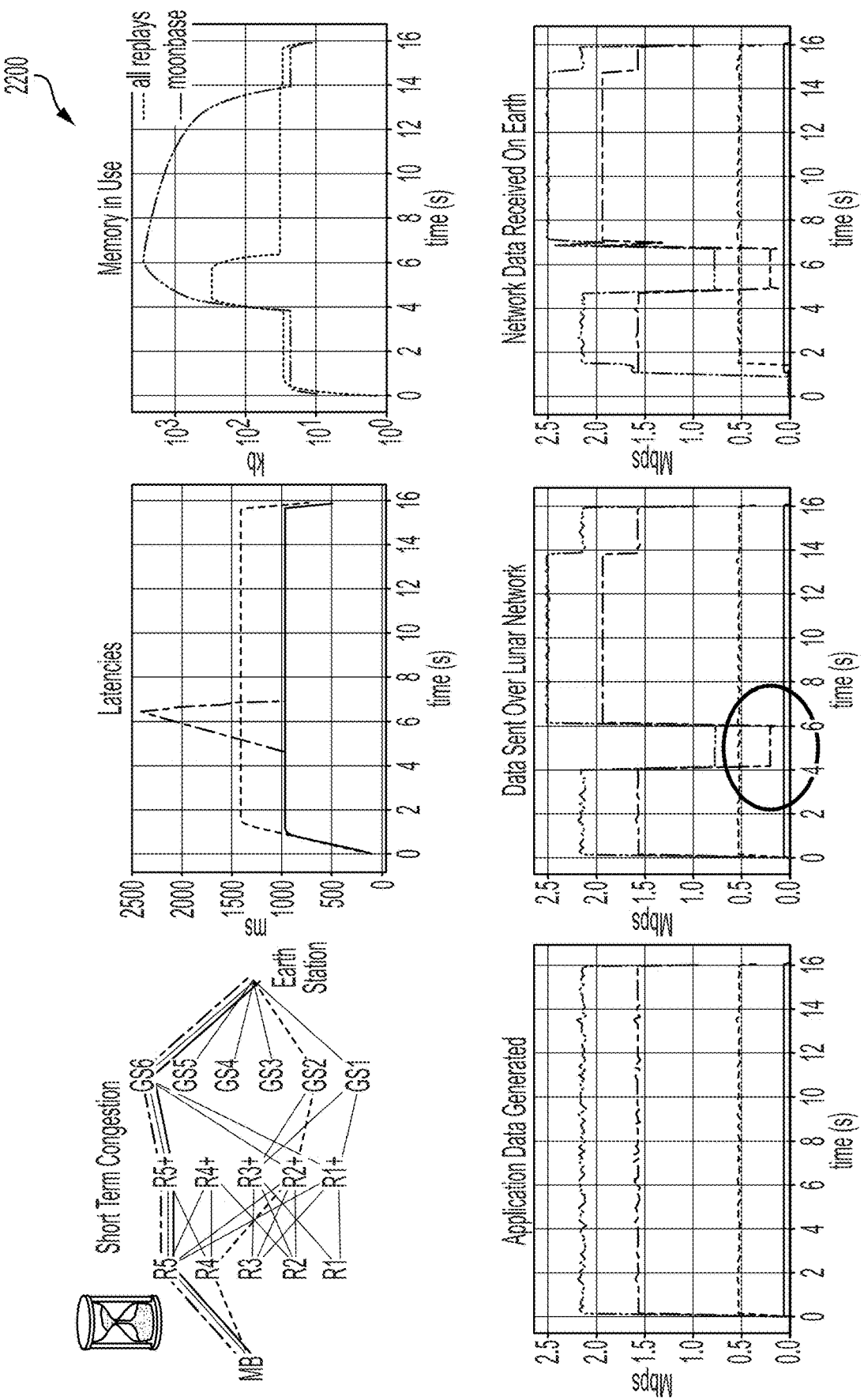

The third scenario shown in schematic 2200 of FIG. 22, shows how INSPiRE module 500 would handle temporary congestion by being intelligent enough to recognize the congestion as transitory and make use of its delay tolerant capabilities. The same pattern as in the previous scenario of FIG. 21 is used, where congestion hits at four seconds, but now congestion lifts at six seconds. During the time of limited capacity, memory is growing. When capacity returns, the Lunar Network begins to unload its buffers and make full use of the network's capacity. This is a seesaw pattern. But again, INSPiRE module 500 avoids disrupting Command and Control traffic because it is policy aware and the link degradation can still support at a minimum the C&C traffic.

Figure 23:
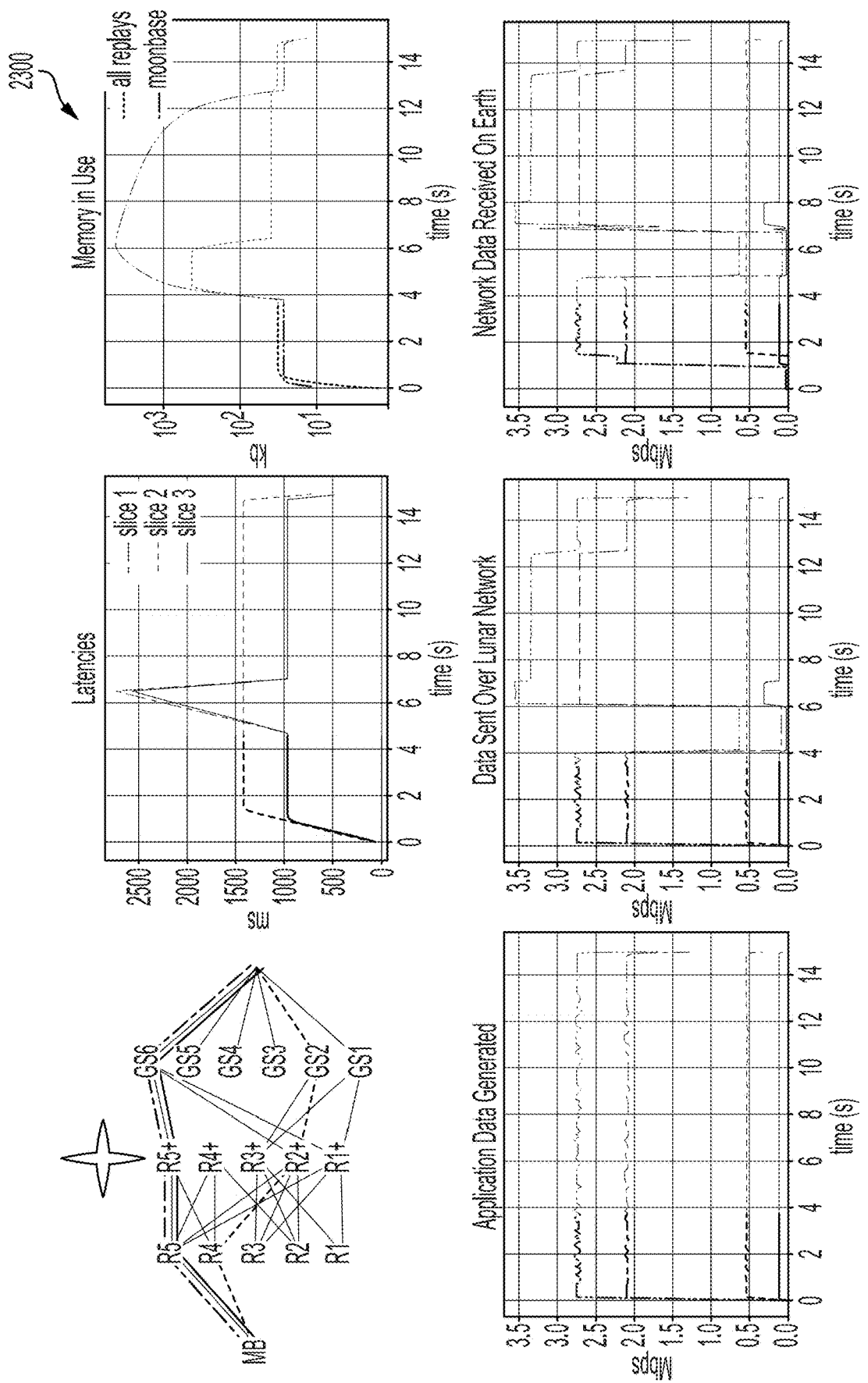
Figure 24:
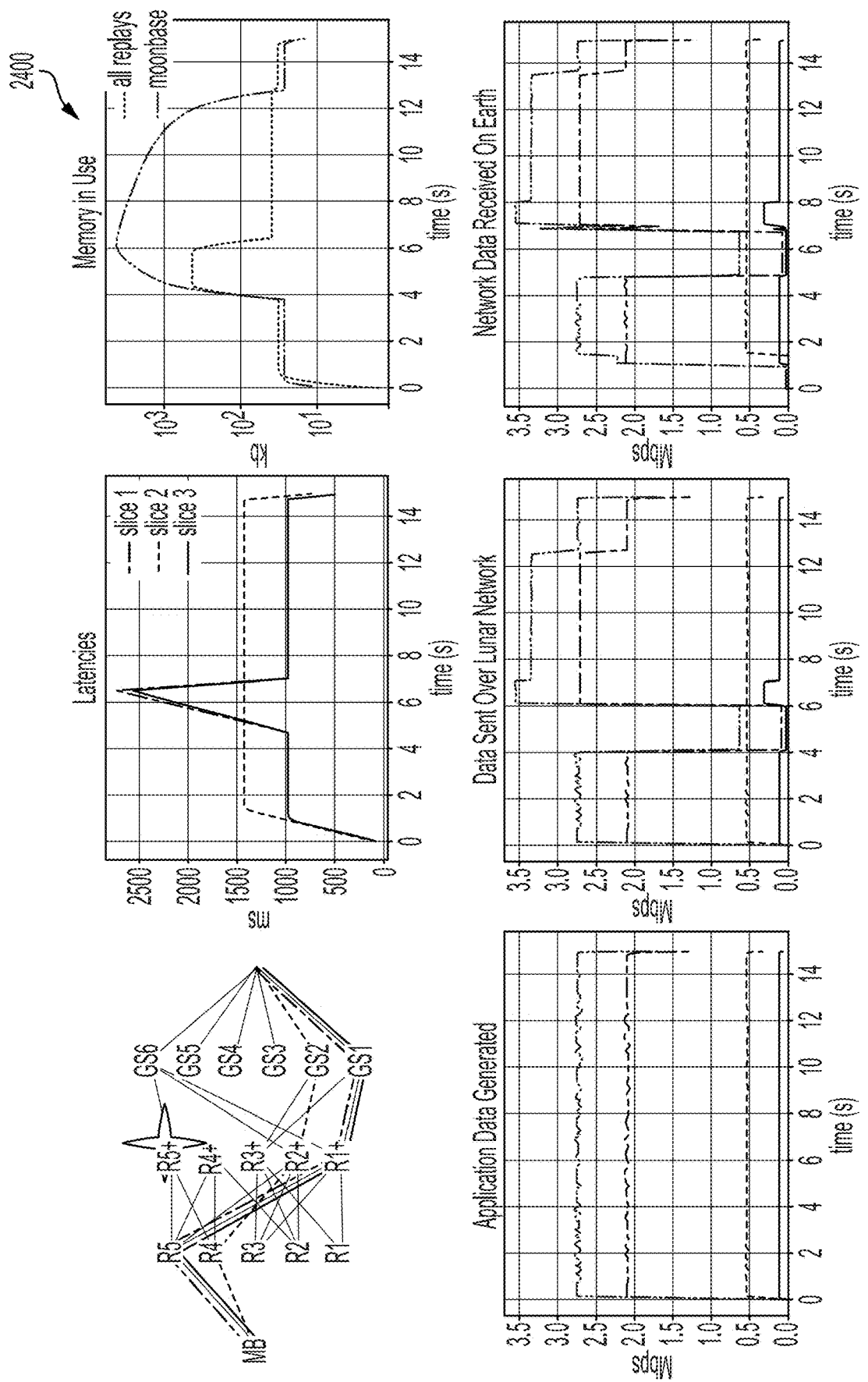

Finally, the last scenario is illustrated in FIGS. 23 and 24, where instead of congestion an actual link failure occurs. INSPiRE module 500 (and/or INSPiRE module 1600 of FIG. 16) uses historical sensing data and machine learning to identify when temporary link degradation occurs versus when an actual link failure has occurred. In this example, INSPiRE module 500 does not route traffic onto the existing route the green Mission Statistics slice is on because that route is supporting that slice with almost all of its capacity. So the slicing engine looks for another route, which it finds and routes the yellow File Transfer and red Command and Control slices on that route. It can be observed that a similar see-saw self-healing aspect of the network as in the case of temporary congestion is present. However, in this case, the network heals itself by reconfiguring the network.

The following discussion provides non-limiting examples of potential uses of INSPiRE and associated technology as described herein.

According to reports, global wireless traffic is expected to reach 53 Exabyte's by 2025 of which 5G will represent 25%. This means there will be considerable switching between 4G and 5G systems as well as WiFi 6. Additionally, when new space-based networks such as Starlink, Oneweb and Iridium are fully deployed, this will result in a very complex RF environment. INSPiRE intelligent routing engine to enable dynamic configuration of RANs in conjunction with CLAIRE as described. INSPiRE modules disclosed herein can also have applications in the telemedicine industry According to various researches and reports, global IoT market will reach $81.5B by 2026, growing at 37.2% CAGR. Global market for IoT data as service solutions will reach $9.3B USD by 2026. 5G New Radio market for private wireless in industrial automation will reach $5.2B by 2026. Embedded AI software and systems in support of IoT will surpass $9B globally by 2026. Machine learning in edge computing will be key to realize the full potential of Iot analytics. Successful smart cities will be dependent on intelligent integration of 5G, AI, edge computing, and IoT. INSPiRE modules disclosed herein along with CLAIRE can be key enablers for smart city networks in that it will allow dynamic addition of relay nodes to the network and distribute network resources according to dynamically determined policies. INSPiRE will enable more efficient use of finite network resources by taking advantage of the 5G network's NFV capabilities and/or supplying the equivalent functionality to legacy networks. Consider Smart Transportation systems where autonomous and human vehicles must connect via 4G/5G/Satellite to traffic management systems. Traffic congestion may create a situation where fixed allocation of resources to the traffic control network will be overwhelmed, but engineering the network for the worst case scenario is economically infeasible. However, unlike the home appliance situation where non-functional webcam or toaster may be an inconvenience, when an autonomous vehicle loses connectivity the results can be fatal. INSPiRE will be able to divert resources to the traffic control network. Thus, INSPiRE capability would greatly improve the connectivity of smart vehicles by using CLAIRE and by its ability to re-deploy the needed network resources to ensure continuous connectivity with adequate bandwidth.

Smart transportation systems are highly reliant on always on, secure communications between autonomous vehicles and traffic management systems. Given that autonomous vehicles are moving, the challenge of maintaining continuous connectivity is very challenging. With the autonomous vehicle market to reach $54 Billion by the year 2026, connectivity is important. To improve the RF connectivity of autonomous vehicles.

Smart manufacturing is composed of an array of systems from energy management, sensor-based warehouse systems, robotics and production lines. While these systems are within a building and protected from weather, RF interference due to multiple transmitters is a big problem. With the global smart manufacturing market to grow to $514 Billion by 2027, solving in building interference due to the growing number of wireless systems will be a major opportunity. Also, many smart manufacturing facilities use Autonomous Guided Vehicles (AGVs), which present the same connectivity issues and dynamic networking challenges that traffic control systems do. Currently the plan is to partner in one of DoD's 5G test beds to prototype Intelligent RF to improve sensor connectivity.

Digital Agriculture (Precision Farming) is focused on optimizing crop yields while minimizing environmental damage. The primary challenge in digital agriculture is self-configuration as sending out people to maintain water and crop sensors are very labor intensive. In addition to networking sensors, one of the most interesting growth opportunities within digital agriculture are robots. The global smart Agriculture market is expected to grow to $20 Billion by 2025.

Telemedicine is another application that may be supported using the new 5G and Wi-Fi Technologies.

CLAIRE and INSPiRE and the solutions they provide can be used in the context of all example applications described above.

CLAIRE and INSPiRE provide a Service-Based Medical Architecture (SBA) operating over 5G Network Functions (NFs) which facilitates smooth integration with over-the-top applications offering SBA services such as AR telementoring, multimedia, and video. Our proposed Telementored Ultra-Reliable Battlefield Outcomes from Medics (TURBO-Medic) system creates a ubiquitous, advanced, secure, real time virtual healthcare platform leveraging 5G architectures, and provides a leap-ahead capability that our warfighters do not possess today. TURBO-Medic brings expert clinician care to the battlefield point of need through corpsmen & medics in the fight. It expands DoD medical scope, effectiveness and efficiency across the continuum of military missions. TURBO-Medic combines a platform approach to telemedical applications with advanced 5G functions to produce affordable, extensible, personalized high-quality care for the military medical personnel in garrison, forward operating bases and in austere locations. TURBO-Medic equips the warfighters with secure, real-time access to world-wide medical experts to assist with complex cases and provide medical telementoring, in garrison and on the battlefield. The TURBO-Medic will provide the warfighters with Augmented and Virtual Reality (AR/VR), Remote Surgery, Blockchain-enabled Authentication, Machine Learning Artificial Intelligence (ML/AI)-based Radio Resource Control, Advanced Data Analytics, Spatial Computing, Distributed Rendering, Cognitive Control Plane, Intelligent Network Slicing, Physical and Cross-Layer Security and 5G implementation to drastically improve the way in which military medical care is delivered. The TURBO-Medic System will provide DoD with an enduring innovation platform, application libraries and DevSecOps processes that will continuously improve military medical mission areas and provide capabilities for the Nation that improve healthcare options for all Americans.

CLAIRE 330 and INSPiRE 332 fit in nicely on a commercial network. FIGS. 25 and 26 illustrate example applications of use of INSPiRE and CLAIRE according to some aspects of the present disclosure, where CLAIRE 330 and INSPiRE 332 components are applied to the commercial 5G, Wi-Fi, and Satellite Communications (SATCOM) architectures. Such a network may include an edge network having 5G and Wi-Fi. It may be supporting a wide variety of applications such as Augmented Reality (AR)/Virtual Reality (VR), Remote Surgery, Real-time Video, or Internet of Medical Things (IoMT). The users leveraging these applications desire to access data from the cloud 602, or they desire to talk to other applications. CLAIRE 330 and INSPiRE 332 can make the network robust and provide the necessary QoS/QoE to a wide variety of applications. CLAIRE 330 and INSPiRE 332 provide resilient communications with multiple pathways to improve security of data transmission as well as assurance that information will be delivered over a heterogeneous communications network using 5G, Wi-Fi, military communications radios, Satellite Communications, Optical Fiber communications, etc. The embodied System provides reliable and secure communication in austere, permissive, and non-permissive environments without suitable and secure network connectivity. Our CLAIRE APP or Cognitive Agent-based architecture enables resilient Communications to ensure interference mitigation via creation of High Resiliency Slices over multiple paths and transports. Such High Resiliency Slices may be formed over military trusted networks (e. g. Tactical Radios+Military Multi-Access Edge Compute (MEC) and Military Transport) or untrusted networks (e. g. Untrusted Commercial 5g, OR Commercial SATCOM) which provide mitigation against link failures and enable reliable 5G communications between devices independent of, or in concert with, established telecommunication infrastructures to provide a robust command and control (C2) policy-based routing engine. These technologies have developed a service-oriented architecture which together provide, RF, and Cross-Layer (PHY/MAC/NET) Optimization.

In one of the illustrated embodiments, CLAIRE and INSPiRE Agents as shown in FIGS. 3, 6, and 7 (and/or in FIGS. 5 and 16) may reside on User Equipment (UE) 2504 such as, for example, a cellular phone. The INSPiRE Engine 332 may reside at the Multi-Access Edge Computing (MEC) node 2506. The INSPiRE Network Slicing Engine 2508 (may be the same as network slicing engine 510 or 1600) may reside in the infrastructure cloud 2502. The Network Slicing decisions are made using thousands of measurements locally and across the network which include RF/PHY/MAC and NET which form a large-scale Feature Matrices. These are then sent to the Machine Learning (ML) Engine which makes optimization decisions based on techniques such as Deep Convolutional Neural Networks (DCNN) and Deep Reinforcement Learning (DRL). In short, CLAIRE 330 provides a cross layer view of the all the environments while INSPiRE 532 scans for all available network connections between sites. In combination, both technologies will greatly improve the reliability of the system. CLAIRE 330 and INSPiRE 332 interact with the MEC node 606, 5G Core 2510, and MANO functions 2512 to initiate and terminate various types of Network Slices 2514 which makes decisions such as which packet needs to be forwarded over which channel (e. g. 5G FR1-Sub 6 GHZ, 5G FR2->6 GHz, mmWave, Wi-Fi, etc.) locally, and via which transport channel globally. It also allows the system to compartmentalize the data streams to keep it out of reach from those who do not have the need to know. In other words, CLAIRE 330 and INSPiRE 332 provide Service-Based Architecture (SBA) and Service Level Agreements (SLA) operating over 5GC Network Functions (NFs) which follow Producer-Consumer Model. The Producer-Consumer model facilitates smooth integration with over-the-top applications offering SBA services. The eMBB communication radio sessions carry multimedia services (e.g., video, AR) between the 5G network and wireless AR devices. A key aspect of reliable communications is to utilize all available links which includes non-DoD commercial satellite and even the Internet. To ensure the appropriate level of security, Zero Trust data protection may be integrated into the MEC nodes 2506 at all sites. The Zero Trust model ensures that data can only be accessed by authenticated and authorized users.

FIG. 27 illustrates an example application of a network slice selection and policy-based routing according to some aspects of the present disclosure. Example process 2700 of FIG. 27 will be described with reference to INSPiRE architecture 500 of FIG. 5 and processes described with reference to FIGS. 8 and/or 11.

At step 2702, a network controller (e.g., network slicing engine 510) may receive a request for use of network resources for transmission. For instance, the network controller may periodically receive a list (e.g., every 24 hours) for a user (e.g., a NASA Mission Manager) that includes a list of all the activities (data transmissions) that the network needs to supports that day. Example list 2704 may be such list.

At step 2706, network slicing engine 510 may query an orbital tracker which may be the same as position tracking component 604 of FIG. 5 to map the routes that are available over the course of this time duration, including capacities and anticipated latencies, An example output 2708 of such query is provided is shown as element 2708 in FIG. 27

At step 2710, network slicing engine 510 may update a slice inventory module such as slice inventory 508 of FIG. 5 and queries the slice inventory 508 to determine if the new network slices can be supported by the network, If the new network slice(s) is/are supported (YES at step 2712), then network slicing engine may invoke policy engine 502 to reprioritize the network slices based on Organization, Missions, and/or Applications, etc.

If the new network slice(s) is/are not supported (NO at step 2712), the at step 2714, policy engine 502 may prioritize the list of network slices.

At step 2716, network slicing engine 510 may develop slice definitions and send these to a slice service tracker such as slice service tracker 506.

An example output of network slice definitions are shown as output 2718 in FIG. 27.

At step 2720, network slicing engine 510 may send the network slice definitions to INSPiRE modules such as INSPiRE modules 514-1, 514-2, 514-K, etc., as shown in FIG. 5, At step 2720, inspire module 514-1 may configure a Policy-based Packet scheduler 2724 and inform a corresponding CLAIRE application (e.g., a CLAIRE application installed on the same network node as INSPiRE module 514-1) of how the packets need to be forwarded.

At step 2722, inspire module 514-1 may send various status information to the network slicing engine 510 so that it can track the performance and make configuration changes if needed.

FIG. 28 shows an example software architecture of an INSPiRE module of FIG. 5, according to some aspects of the present disclosure. Architecture 2800 can be that of INSPiRE modules 514-1, 514-2, . . . , 514-K.

INSPiRE software components shown in architecture 2800 are designed in a modular fashion to talk to various peripherals using inter-process communication protocols such as ZMQ, ICMP etc.

FIG. 29 shows the INSPiRE software architecture at the Mission Control (HQ) according to some aspects of the present disclosure. Architecture 2900 can be that of network slicing engine 510.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method comprising:
receiving, by a network slicing engine of a heterogeneous multi-vendor network, at least one request from at least one network endpoint for access to the heterogeneous multi-vendor network for data transmission, wherein the network slicing engine is executed on at least one a plurality of nodes of the heterogeneous multi-vendor network, the plurality of nodes configured to enable wireless communication between at least two network endpoints, each of the plurality of nodes being configured to operate according to one of a plurality of wireless communication schemes;
receiving, by the network slicing engine, information on state of operation of a plurality of communication links between the plurality of nodes;
determining, by the network slicing engine, a set of data transmission routes for the at least one request;
assigning, by the network slicing engine, a network slice for serving the at least one request;

determining, by the network slicing engine and based on the set of data transmission routes, an end-to-end route for the network slice; and sending, by the network slicing engine, network traffic associated with the at least one request using the network slice and over the end-to-end route.

2. The method of claim 1, wherein the information on the state of operation of the plurality of communication links is received from a software application executed one each of the plurality of nodes, the software application performing cross-layer optimization of a corresponding one of the plurality of communication links.

3. The method of claim 1, wherein the plurality of wireless communication schemes include at least two or more of 4G, 5G, 6G, WiFi, and radar communication schemes.

4. The method of claim 1, wherein the network slicing engine is executed on each of the plurality of nodes.

5. The method of claim 1, wherein the at least one request includes a description of the at least one request, an acceptable latency associated with the at least one request, an acceptable throughput associated with the at least one request, and a corresponding Quality of Experience associated with the at least one request.

6. The method of claim 1, wherein the end-to-end route is data path through at least two of the plurality of wireless communication schemes.

7. The method of claim 1, further comprising:
selecting the network slice from among a plurality of network slices available in a network slice inventory.

8. The method of claim 7, wherein the network slice is selected based on one or more parameters associated with the at least one request.

9. The method of claim 1, wherein the end-to-end route is determined across heterogeneous multi-vendor network using a solution to an optimization problem.

10. The method of claim 9, wherein the optimization problem is based on the set of data transmission routes and associated characteristics of each transmission route in the set of data transmission routes, one or more performance parameters associated with the at least one request, and available network slices.

11. One or more non-transitory computer-readable media comprising computer-readable instructions, which when executed by one or more processors configured to operate as a network slicing engine of a heterogeneous multi-vendor network, cause the network slicing engine to:
receive at least one request from at least one network endpoint for access to the heterogeneous multi-vendor network for data transmission, wherein the network slicing engine is executed on at least one a plurality of nodes of the heterogeneous multi-vendor network, the plurality of nodes configured to enable wireless communication between at least two network endpoints, each of the plurality of nodes being configured to operate according to one of a plurality of wireless communication schemes;

receive information on state of operation of a plurality of communication links between the plurality of nodes;

determine a set of data transmission routes for the at least one request;

assign a network slice for serving the at least one request;

determine, based on the set of data transmission routes, an end-to-end route for the network slice; and send network traffic associated with the at least one request using the network slice and over the end-to-end route.

12. The one or more non-transitory computer-readable media of claim 11, wherein the information on the state of operation of the plurality of communication links is received from a software application executed one each of the plurality of nodes, the software application performing cross-layer optimization of a corresponding one of the plurality of communication links.

13. The one or more non-transitory computer-readable media of claim 12, wherein the plurality of wireless communication schemes include at least two or more of 4G, 5G, 6G, WiFi, and radar communication schemes.

14. The one or more non-transitory computer-readable media of claim 11, wherein the network slicing engine is executed on each of the plurality of nodes.

15. The one or more non-transitory computer-readable media of claim 11, wherein the at least one request includes a description of the at least one request, an acceptable latency associated with the at least one request, an acceptable throughput associated with the at least one request, and a corresponding Quality of Experience associated with the at least one request.

16. The one or more non-transitory computer-readable media of claim 11, wherein the end-to-end route is data path through at least two of the plurality of wireless communication schemes.

17. The one or more non-transitory computer-readable media of claim 11, wherein the execution of the computer-readable instructions further cause the network slicing engine to select the network slice from among a plurality of network slices available in a network slice inventory.

18. The one or more non-transitory computer-readable media of claim 17, wherein the network slice is selected based on one or more parameters associated with the at least one request.

19. The one or more non-transitory computer-readable media of claim 11, wherein the end-to-end route is determined across heterogeneous multi-vendor network using a solution to an optimization problem.

20. The one or more non-transitory computer-readable media of claim 19, wherein the optimization problem is based on the set of data transmission routes and associated characteristics of each transmission route in the set of data transmission routes, one or more performance parameters associated with the at least one request, and available network slices.

* * * * *